US011893880B2

(12) United States Patent
Wedig et al.

(10) Patent No.: US 11,893,880 B2
(45) Date of Patent: Feb. 6, 2024

(54) ENHANCED EMERGENCY DETECTION SYSTEM

(71) Applicant: ONEEVENT TECHNOLOGIES, INC., Mount Horeb, WI (US)

(72) Inventors: Kurt Joseph Wedig, Mount Horeb, WI (US); Daniel Ralph Parent, Mount Horeb, WI (US); Anton Vermaak, Mount Horeb, WI (US); Scott Holmstrom, Mount Horeb, WI (US); Chris Snyder, Blanchardville, WI (US)

(73) Assignee: OneEvent Technologies, Inc., Mount Horeb, WI (US)

( * ) Notice: Subject to any disclaimer, the term of this patent is extended or adjusted under 35 U.S.C. 154(b) by 168 days.

(21) Appl. No.: 17/366,273

(22) Filed: Jul. 2, 2021

(65) Prior Publication Data

US 2021/0335107 A1 Oct. 28, 2021

Related U.S. Application Data

(63) Continuation of application No. 16/826,694, filed on Mar. 23, 2020, now Pat. No. 11,055,973, which is a continuation of application No. 15/997,313, filed on Jun. 4, 2018, now Pat. No. 10,600,292, which is a continuation of application No. 15/606,229, filed on May 26, 2017, now Pat. No. 9,990,818, which is a (Continued)

(51) Int. Cl.

| | |
|---|---|
| ***G08B 7/06*** | (2006.01) |
| ***G08B 17/06*** | (2006.01) |
| ***G08B 17/103*** | (2006.01) |
| ***G08B 21/22*** | (2006.01) |
| ***G08B 27/00*** | (2006.01) |
| ***G08B 25/00*** | (2006.01) |

(52) U.S. Cl.

CPC ............. *G08B 7/066* (2013.01); *G08B 17/06* (2013.01); *G08B 17/103* (2013.01); *G08B 21/22* (2013.01); *G08B 25/009* (2013.01); *G08B 27/001* (2013.01)

(58) Field of Classification Search

CPC ...... G08B 7/066; G08B 17/06; G08B 17/103; G08B 21/22; G08B 25/009; G08B 27/001

See application file for complete search history.

(56) References Cited

U.S. PATENT DOCUMENTS 7,579,945 B1 * 8/2009 Richter .................. G08B 25/14 340/506

7,683,793 B2 3/2010 Li et al.

(Continued)

OTHER PUBLICATIONS

Final Office Action in U.S. Appl. No. 15/997,313 dated Aug. 21, 2019.

(Continued)

*Primary Examiner* — Mohamed Barakat

(74) *Attorney, Agent, or Firm* — Kenneth A. Smith

(57) ABSTRACT

A method includes reading a digital signal from a sensing device in an area of a structure, where the digital signal is configured to be present periodically. A trailing edge of the digital signal is determined. An analog signal from the sensing device is read, where the analog signal includes an output from a sensor included in the sensing device, and where the sensor is configured to detect an aspect of an environment. The analog signal is read after the trailing edge of the digital signal.

20 Claims, 29 Drawing Sheets

Related U.S. Application Data continuation of application No. 14/106,187, filed on Dec. 13, 2013, now Pat. No. 9,666,042.

(60) Provisional application No. 61/736,915, filed on Dec. 13, 2012.

(56) References Cited

U.S. PATENT DOCUMENTS

| | | | | |
|---|---|---|---|---|
| 8,798,548 | B1 | 8/2014 | Carbajal | |
| 8,843,241 | B2 | 9/2014 | Saberi et al. | |
| 2005/0190053 | A1* | 9/2005 | Dione | G08B 21/22 340/500 |
| 2007/0219751 | A1 | 9/2007 | Huang | |
| 2008/0265033 | A1 | 10/2008 | Shintani | |
| 2009/0153152 | A1 | 6/2009 | Maharyta et al. | |
| 2010/0148672 | A1* | 6/2010 | Hopper | F21V 23/0442 315/158 |
| 2011/0241877 | A1* | 10/2011 | Wedig | G08B 17/00 340/540 |
| 2011/0242614 | A1 | 10/2011 | Okada | |
| 2012/0081757 | A1* | 4/2012 | Komiya | H04N 1/00745 358/296 |
| 2013/0147604 | A1 | 6/2013 | Jones et al. | |

OTHER PUBLICATIONS

Non-Final Office Action in U.S. Appl. No. 14/106,187 dated Oct. 6, 2016.

Non-Final Office Action in U.S. Appl. No. 15/606,229 dated Sep. 8, 2017.

Non-Final Office Action in U.S. Appl. No. 15/997,313 dated Nov. 30, 2018.

Notice of Allowance in U.S. Appl. No. 14/106,187 dated Mar. 17, 2017.

Notice of Allowance in U.S. Appl. No. 15/997,313 dated Nov. 15, 2019.

U.S. Notice of Allowance in U.S. Appl. No. 15/606,229 dated Feb. 2, 2018.

* cited by examiner

ENHANCED EMERGENCY DETECTION SYSTEM

CROSS-REFERENCE TO RELATED APPLICATIONS

This application is a continuation of U.S. application Ser. No. 16/826,694, filed Mar. 23, 2020, which is pending, which is a continuation of U.S. application Ser. No. 15/997,313, filed Jun. 4, 2018, now U.S. Pat. No. 10,600,292, issued Mar. 24, 2020, which is a continuation of U.S. application Ser. No. 15/606,229, filed May 26, 2017, now U.S. Pat. No. 9,990,818, issued Jun. 6, 2018, which is a continuation of U.S. application Ser. No. 14/106,187, filed Dec. 13, 2013, now U.S. Pat. No. 9,666,042, issued May 30, 2017, which claims priority to U.S. Provisional Application No. 61/736,915 filed on Dec. 13, 2012, the entire disclosure of each of which are incorporated herein by reference in their entirety for any and all purposes.

BACKGROUND

Most homes, office buildings, stores, etc. are equipped with one or more smoke detectors. In the event of a fire, the smoke detectors are configured to detect smoke and sound an alarm. The alarm, which is generally a series of loud beeps or buzzes, is intended to alert individuals of the fire such that the individuals can evacuate the building. Unfortunately, with the use of smoke detectors, there are still many casualties every year caused by building fires and other hazardous conditions. Confusion in the face of an emergency, poor visibility, unfamiliarity with the building, etc. can all contribute to the inability of individuals to effectively evacuate a building. Further, in a smoke detector equipped building with multiple exits, individuals have no way of knowing which exit is safest in the event of a fire or other evacuation condition. As such, the inventors have perceived an intelligent evacuation system to help individuals successfully evacuate a building in the event of an evacuation condition. The inventors have also perceived an enhanced emergency detection system to help disseminate information in the event of an evacuation condition.

SUMMARY

An illustrative method includes receiving occupancy information from a node located in an area of a structure, where the occupancy information includes a number of individuals located in the area. An indication of an evacuation condition is received from the node. One or more evacuation routes are determined based at least in part on the occupancy information. An instruction is provided to the node to convey at least one of the one or more evacuation routes.

An illustrative node includes a transceiver and a processor operatively coupled to the transceiver. The transceiver is configured to receive occupancy information from a second node located in an area of a structure. The transceiver is also configured to receive an indication of an evacuation condition from the second node. The processor is configured to determine an evacuation route based at least in part on the occupancy information. The processor is further configured to cause the transceiver to provide an instruction to the second node to convey the evacuation route.

An illustrative system includes a first node and a second node. The first node includes a first processor, a first sensor operatively coupled to the first processor, a first occupancy unit operatively coupled to the first processor, a first transceiver operatively coupled to the first processor, and a first warning unit operatively coupled to the processor. The first sensor is configured to detect an evacuation condition. The first occupancy unit is configured to determine occupancy information. The first transceiver is configured to transmit an indication of the evacuation condition and the occupancy information to the second node. The second node includes a second transceiver and a second processor operatively coupled to the second transceiver. The second transceiver is configured to receive the indication of the evacuation condition and the occupancy information from the first node. The second processor is configured to determine one or more evacuation routes based at least in part on the occupancy information. The second processor is also configured to cause the second transceiver to provide an instruction to the first node to convey at least one of the one or more evacuation routes through the first warning unit.

An illustrative method includes reading a digital signal from a sensing device in an area of a structure, where the digital signal is configured to be present periodically. A trailing edge of the digital signal is determined. An analog signal from the sensing device is read, where the analog signal includes an output from a sensor included in the sensing device, and where the sensor is configured to detect an aspect of an environment. The analog signal is read after the trailing edge of the digital signal.

An illustrative non-transitory computer readable medium having stored thereon instructions executable by a processor, includes instructions to read a digital signal from a sensing device in an area of a structure. The digital signal is configured to be present periodically, and a trailing edge of the digital signal is determined. An analog signal from the sensing device is read, where the analog signal includes an output from a sensor included in the sensing device. The sensor is configured to detect an aspect of an environment. The analog signal is read after the trailing edge of the digital signal.

An illustrative device includes a sensing device, where the sensing device is in an area of a structure. A microcontroller is configured to read a digital signal from the sensing device, where the digital signal is configured to be present periodically. A trailing edge of the digital signal is determined. An analog signal from the sensing device is read, where the analog signal includes an output from a sensor included in the sensing device. The sensor is configured to detect an aspect of an environment. The analog signal is read after the trailing edge of the digital signal.

Other principal features and advantages will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings.

DETAILED DESCRIPTION

Described herein are illustrative evacuation systems for use in assisting individuals with evacuation from a structure during an evacuation condition. An illustrative evacuation system can include one or more sensory nodes configured to detect and/or monitor occupancy and to detect the evacuation condition. Based on the type of evacuation condition, the magnitude (or severity) of the evacuation condition, the location of the sensory node which detected the evacuation condition, the occupancy information, and/or other factors, the evacuation system can determine one or more evacuation routes such that individuals are able to safely evacuate the structure. The one or more evacuation routes can be conveyed to the individuals in the structure through one or more spoken audible evacuation messages. The evacuation system can also contact an emergency response center in response to the evacuation condition.

Also described herein are a system, method, and computer-readable medium for enhanced emergency detection. This can include fire safety equipment, such as a smoke alarm/detector, with end-to-end connectivity over the internet into a cloud storage and processing facility. The network begins with on-site wireless nodes. These nodes self-form a mesh network such that each node is reachable via the internet through one or more bridge nodes connected to the internet by various methods, not limited to but including GSM (Global System for Mobile Communications), WIFI, etc. The nodes' communication is bidirectional, such that they can both send messages and receive directives. A security layer ensures that message contents are protected while traversing public networks. The security layer also signs messages to ensure that received packets originated from authorized sources. IP addressable nodes allow the site owner to monitor the status of the nodes locally, in addition to a cloud system monitoring remotely. The remote monitoring system can correlate data to make more informed decisions than a stand-alone unit. In addition, the data can be stored for analysis and archival purposes. Live data can be provided to authorized parties in the event of an emergency. Enhancements to sensors like a smoke detector may be made. A user interface for interfacing with a portable device can be provided. Solutions to possible issues that may arise during implementation of enhanced emergency detection are also provided.

Figure 1:
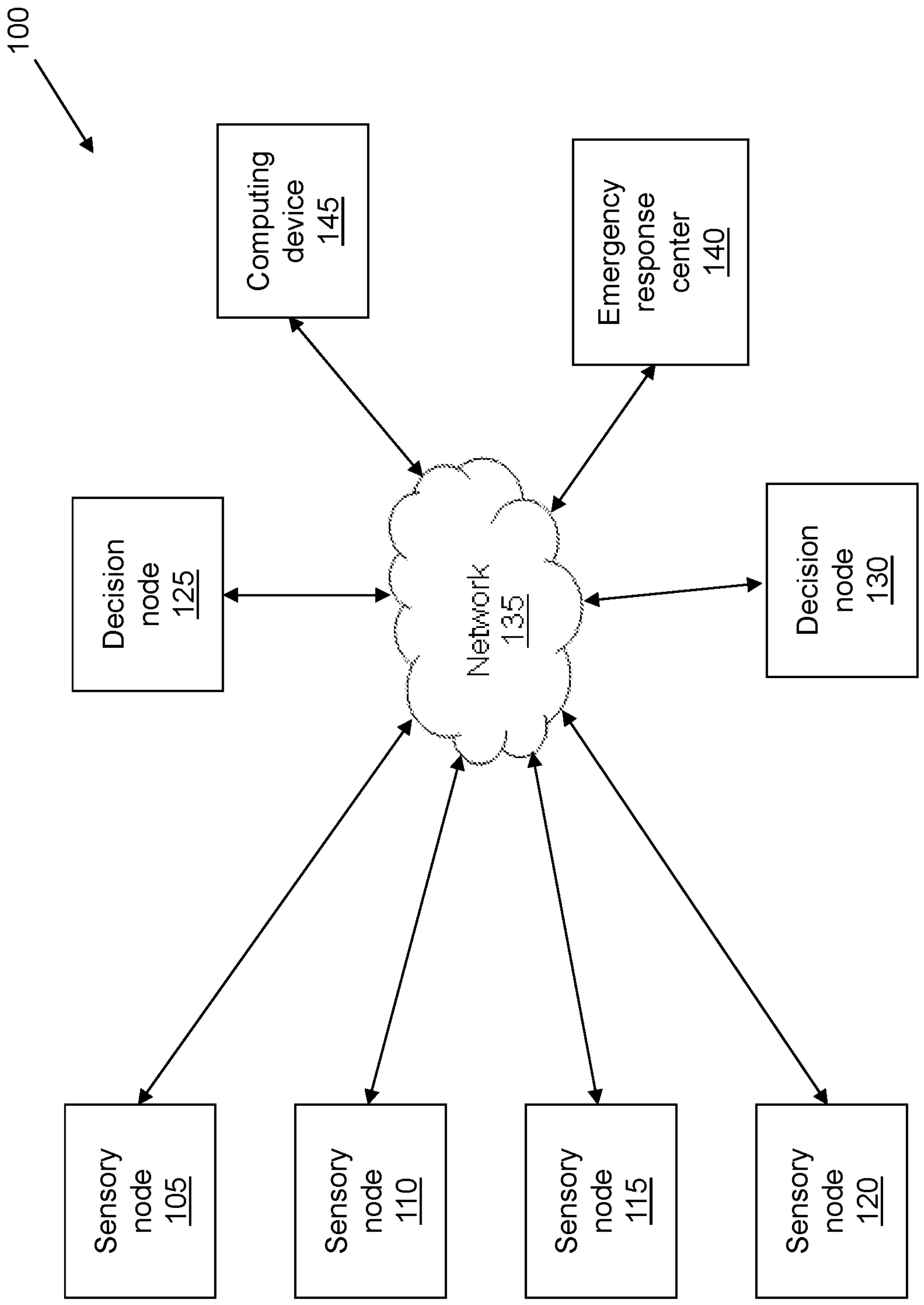
FIG. 1 is a block diagram illustrating an evacuation system in accordance with an illustrative embodiment.

FIG. 1 is a block diagram of an evacuation system 100 in accordance with an illustrative embodiment. In alternative embodiments, evacuation system 100 may include additional, fewer, and/or different components. Evacuation system 100 includes a sensory node 105, a sensory node 110, a sensory node 115, and a sensory node 120. In alternative embodiments, additional or fewer sensory nodes may be included. Evacuation system 100 also includes a decision node 125 and a decision node 130. Alternatively, additional or fewer decision nodes may be included.

In an illustrative embodiment, sensory nodes 105, 110, 115, and 120 can be configured to detect an evacuation condition. The evacuation condition can be a fire, which may be detected by the presence of smoke and/or excessive heat. The evacuation condition may also be an unacceptable level of a toxic gas such as carbon monoxide, nitrogen dioxide, etc. Sensory nodes 105, 110, 115, and 120 can be distributed throughout a structure. The structure can be a home, an office building, a commercial space, a store, a factory, or any other building or structure. As an example, a single story office building can have one or more sensory nodes in each office, each bathroom, each common area, etc. An illustrative sensory node is described in more detail with reference to FIG. 2.

Sensory nodes 105, 110, 115, and 120 can also be configured to detect and/or monitor occupancy such that evacuation system 100 can determine one or more optimal evacuation routes. For example, sensory node 105 may be placed in a conference room of a hotel. Using occupancy detection, sensory node 105 can know that there are approximately 80 individuals in the conference room at the time of an evacuation condition. Evacuation system 100 can use this occupancy information (i.e., the number of individuals and/or the location of the individuals) to determine the evacuation route(s). For example, evacuation system 100 may attempt to determine at least two safe evacuation routes from the conference room to avoid congestion that may occur if only a single evacuation route is designated. Occupancy detection and monitoring are described in more detail with reference to FIG. 2.

Decision nodes 125 and 130 can be configured to determine one or more evacuation routes upon detection of an evacuation condition. Decision nodes 125 and 130 can determine the one or more evacuation routes based on occupancy information such as a present occupancy or an occupancy pattern of a given area, the type of evacuation condition, the magnitude of the evacuation condition, the location(s) at which the evacuation condition is detected, the layout of the structure, etc. The occupancy pattern can be learned over time as the nodes monitor areas during quiescent conditions. Upon determination of the one or more evacuation routes, decision nodes 125 and 130 and/or sensory nodes 105, 110, 115, and 120 can convey the evacuation route(s) to the individuals in the structure. In an illustrative embodiment, the evacuation route(s) can be conveyed as audible voice evacuation messages through speakers of decision nodes 125 and 130 and/or sensory nodes 105, 110, 115, and 120. Alternatively, the evacuation route(s) can be conveyed by any other method. An illustrative decision node is described in more detail with reference to FIG. 3.

Sensory nodes 105, 110, 115, and 120 can communicate with decision nodes 125 and 130 through a network 135. Network 135 can include a short-range communication network such as a Bluetooth network, a Zigbee network, etc. Network 135 can also include a local area network (LAN), a wide area network (WAN), a telecommunications network, the Internet, a public switched telephone network (PSTN), and/or any other type of communication network known to those of skill in the art. Network 135 can be a distributed intelligent network such that evacuation system 100 can make decisions based on sensory input from any nodes in the population of nodes. In an illustrative embodiment, decision nodes 125 and 130 can communicate with sensory nodes 105, 110, 115, and 120 through a short-range communication network. Decision nodes 125 and 130 can also communicate with an emergency response center 140 through a telecommunications network, the Internet, a PSTN, etc. As such, in the event of an evacuation condition, emergency response center 140 can be automatically notified. Emergency response center 140 can be a 911 call center, a fire department, a police department, etc.

In the event of an evacuation condition, a sensory node that detected the evacuation condition can provide an indication of the evacuation condition to decision node 125 and/or decision node 130. The indication can include an identification and/or location of the sensory node, a type of the evacuation condition, and/or a magnitude of the evacuation condition. The magnitude of the evacuation condition can include an amount of smoke generated by a fire, an amount of heat generated by a fire, an amount of toxic gas in the air, etc. The indication of the evacuation condition can be used by decision node 125 and/or decision node 130 to determine evacuation routes. Determination of an evacuation route is described in more detail with reference to FIG. 4.

In an illustrative embodiment, sensory nodes 105, 110, 115, and 120 can also periodically provide status information to decision node 125 and/or decision node 130. The status information can include an identification of the sensory node, location information corresponding to the sensory node, information regarding battery life, and/or information regarding whether the sensory node is functioning properly. As such, decision nodes 125 and 130 can be used as a diagnostic tool to alert a system administrator or other user of any problems with sensory nodes 105, 110, 115, and 120. Decision nodes 125 and 130 can also communicate status information to one another for diagnostic purposes. The system administrator can also be alerted if any of the nodes of evacuation system 100 fail to timely provide status information according to a periodic schedule. In one embodiment, a detected failure or problem within evacuation system 100 can be communicated to the system administrator or other user via a text message or an e-mail.

In one embodiment, network 135 can include a redundant (or self-healing) mesh network centered around sensory nodes 105, 110, 115, and 120 and decision nodes 125 and 130. As such, sensory nodes 105, 110, 115, and 120 can communicate directly with decision nodes 125 and 130, or indirectly through other sensory nodes. As an example, sensory node 105 can provide status information directly to decision node 125. Alternatively, sensory node 105 can provide the status information to sensory node 115, sensory node 115 can provide the status information (relative to sensory node 105) to sensory node 120, and sensory node 120 can provide the status information (relative to sensory node 105) to decision node 125. The redundant mesh network can be dynamic such that communication routes can be determined on the fly in the event of a malfunctioning node. As such, in the example above, if sensory node 120 is down, sensory node 115 can automatically provide the status information (relative to sensory node 105) directly to decision node 125 or to sensory node 110 for provision to decision node 125. Similarly, if decision node 125 is down, sensory nodes 105, 110, 115, and 120 can be configured to convey status information directly or indirectly to decision node 130. The redundant mesh network can also be static such that communication routes are predetermined in the event of one or more malfunctioning nodes. Network 135 can receive/transmit messages over a large range as compared to the actual wireless range of individual nodes. Network 135 can also receive/transmit messages through various wireless obstacles by utilizing the mesh network capability of evacuation system 100. As an example, a message destined from an origin of node A to a distant destination of node Z (i.e., where node A and node Z are not in direct range of one another) may use any of the nodes between node A and node Z to convey the information. In one embodiment, the mesh network can operate within the 2.4 GHz range. Alternatively, any other range(s) may be used.

In an illustrative embodiment, each of sensory nodes 105, 110, 115, and 120 and/or each of decision nodes 125 and 130 can know its location. The location can be global positioning system (GPS) coordinates. In one embodiment, a computing device 145 can be used to upload the location to sensory nodes 105, 110, 115, and 120 and/or decision nodes 125 and 130. Computing device 145 can be a portable GPS system, a cellular device, a laptop computer, or any other type of communication device configured to convey the location. As an example, computing device 145 can be a GPS-enabled laptop computer. During setup and installation of evacuation system 100, a technician can place the GPS-enabled laptop computer proximate to sensory node 105. The GPS-enabled laptop computer can determine its current GPS coordinates, and the GPS coordinates can be uploaded to sensory node 105. The GPS coordinates can be uploaded to sensory node 105 wirelessly through network 135 or through a wired connection. Alternatively, the GPS coordinates can be manually entered through a user interface of sensory node 105. The GPS coordinates can similarly be uploaded to sensory nodes 110, 115, and 120 and decision nodes 125 and 130. In one embodiment, sensory nodes 105, 110, 115, and 120 and/or decision nodes 125 and 130 may be GPS-enabled for determining their respective locations. In one embodiment, each node can have a unique identification number or tag, which may be programmed during the manufacturing of the node. The identification can be used to match the GPS coordinates to the node during installation. Computing device 145 can use the identification information to obtain a one-to-one connection with the node to correctly program the GPS coordinates over network 135. In an alternative embodiment, GPS coordinates may not be used, and the location can be in terms of position with a particular structure. For example, sensory node 105 may be located in room five on the third floor of a hotel, and this information can be the location information for sensory node 105. Regardless of how the locations are represented, evacuation system 100 can determine the evacuation route(s) based at least in part on the locations and a known layout of the structure.

In one embodiment, a zeroing and calibration method may be employed to improve the accuracy of the indoor GPS positioning information programmed into the nodes during installation. Inaccuracies in GPS coordinates can occur due to changes in the atmosphere, signal delay, the number of viewable satellites, etc., and the expected accuracy of GPS is usually about 6 meters. To calibrate the nodes and improve location accuracy, a relative coordinated distance between nodes can be recorded as opposed to a direct GPS coordinate. Further improvements can be made by averaging multiple GPS location coordinates at each perspective node over a given period (i.e., 5 minutes, etc.) during evacuation system 100 configuration. At least one node can be designated as a zeroing coordinate location. All other measurements can be made with respect to the zeroing coordinate location. In one embodiment, the accuracy of GPS coordinates can further be improved by using an enhanced GPS location band such as the military P(Y) GPS location band. Alternatively, any other GPS location band may be used.

Figure 2:
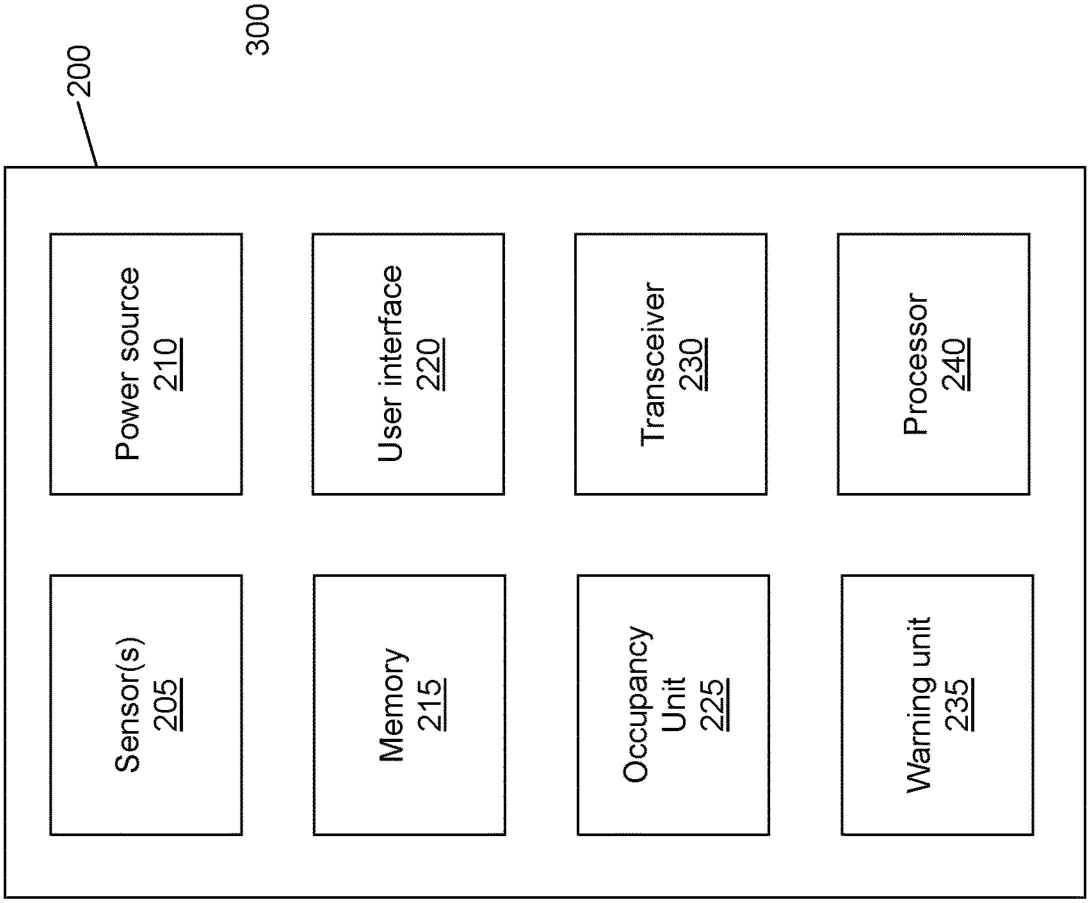
FIG. 2 is a block diagram illustrating a sensory node in accordance with an illustrative embodiment.

FIG. 2 is a block diagram illustrating a sensory node 200 in accordance with an illustrative embodiment. In alternative embodiments, sensory node 200 may include additional, fewer, and/or different components. Sensory node 200 includes sensor(s) 205, a power source 210, a memory 215, a user interface 220, an occupancy unit 225, a transceiver 230, a warning unit 235, and a processor 240. Sensor(s) 205 can include a smoke detector, a heat sensor, a carbon monoxide sensor, a nitrogen dioxide sensor, and/or any other type of hazardous condition sensor known to those of skill in the art. In an illustrative embodiment, power source 210 can be a battery. Sensory node 200 can also be hard-wired to the structure such that power is received from the power supply of the structure (i.e., utility grid, generator, solar cell, fuel cell, etc.). In such an embodiment, power source 210 can also include a battery for backup during power outages.

Memory 215 can be configured to store identification information corresponding to sensory node 200. The identification information can be any indication through which other sensory nodes and decision nodes are able to identify sensory node 200. Memory 215 can also be used to store location information corresponding to sensory node 200. The location information can include global positioning system (GPS) coordinates, position within a structure, or any other information which can be used by other sensory nodes and/or decision nodes to determine the location of sensory node 200. In one embodiment, the location information may be used as the identification information. The location information can be received from computing device 145 described with reference to FIG. 1, or from any other source. Memory 215 can further be used to store routing information for a mesh network in which sensory node 200 is located such that sensory node 200 is able to forward information to appropriate nodes during normal operation and in the event of one or more malfunctioning nodes. Memory 215 can also be used to store occupancy information and/or one or more evacuation messages to be conveyed in the event of an evacuation condition. Memory 215 can further be used for storing adaptive occupancy pattern recognition algorithms and for storing compiled occupancy patterns.

User interface 220 can be used by a system administrator or other user to program and/or test sensory node 200. User interface 220 can include one or more controls, a liquid crystal display (LCD) or other display for conveying information, one or more speakers for conveying information, etc. In one embodiment, a user can utilize user interface 220 to record an evacuation message to be played back in the event of an evacuation condition. As an example, sensory node 200 can be located in a bedroom of a small child. A parent of the child can record an evacuation message for the child in a calm, soothing voice such that the child does not panic in the event of an evacuation condition. An example evacuation message can be "wake up Kristin, there is a fire, go out the back door and meet us in the back yard as we have practiced." Different evacuation messages may be recorded for different evacuation conditions. Different evacuation messages may also be recorded based on factors such as the location at which the evacuation condition is detected. As an example, if a fire is detected by any of sensory nodes one through six, a first pre-recorded evacuation message can be played (i.e., exit through the back door), and if the fire is detected at any of nodes seven through twelve, a second pre-recorded evacuation message can be played (i.e., exit through the front door). User interface 220 can also be used to upload location information to sensory node 200, to test sensory node 200 to ensure that sensory node 200 is functional, to adjust a volume level of sensory node 200, to silence sensory node 200, etc. User interface 220 can also be used to alert a user of a problem with sensory node 200 such as low battery power or a malfunction. In one embodiment, user interface 220 can be used to record a personalized message in the event of low battery power, battery malfunction, or other problem. For example, if the device is located within a home structure, the pre-recorded message may indicate that "the evacuation detector in the hallway has low battery power, please change." User interface 220 can further include a button such that a user can report an evacuation condition and activate the evacuation system.

Occupancy unit 225 can be used to detect and/or monitor occupancy of a structure. As an example, occupancy unit 225 can detect whether one or more individuals are in a given room or area of a structure. A decision node can use this occupancy information to determine an appropriate evacuation route or routes. As an example, if it is known that two individuals are in a given room, a single evacuation route can be used. However, if three hundred individuals are in the room, multiple evacuation routes may be provided to prevent congestion. Occupancy unit 225 can also be used to monitor occupancy patterns. As an example, occupancy unit 225 can determine that there are generally numerous individuals in a given room or location between the hours of 8:00 am and 6:00 pm on Mondays through Fridays, and that there are few or no individuals present at other times. A decision node can use this information to determine appropriate evacuation route(s). Information determined by occupancy unit 225 can also be used to help emergency responders in responding to the evacuation condition. For example, it may be known that one individual is in a given room of the structure. The emergency responders can use this occupancy information to focus their efforts on getting the individual out of the room. The occupancy information can be provided to an emergency response center along with a location and type of the evacuation condition. Occupancy unit 225 can also be used to help sort rescue priorities based at least in part on the occupancy information while emergency responders are on route to the structure.

Occupancy unit 225 can detect/monitor the occupancy using one or more motion detectors to detect movement. Occupancy unit 225 can also use a video or still camera and video/image analysis to determine the occupancy. Occupancy unit 225 can also use respiration detection by detecting carbon dioxide gas emitted as a result of breathing. An example high sensitivity carbon dioxide detector for use in respiration detection can be the MG-811 CO2 sensor manufactured by Henan Hanwei Electronics Co., Ltd. based in Zhengzhou, China. Alternatively, any other high sensitivity carbon dioxide sensor may be used. Occupancy unit 225 can also be configured to detect methane, or any other gas which may be associated with human presence.

Occupancy unit 225 can also use infrared sensors to detect heat emitted by individuals. In one embodiment, a plurality of infrared sensors can be used to provide multidirectional monitoring. Alternatively, a single infrared sensor can be used to scan an entire area. The infrared sensor(s) can be combined with a thermal imaging unit to identify thermal patterns and to determine whether detected occupants are human, feline, canine, rodent, etc. The infrared sensors can also be used to determine if occupants are moving or still, to track the direction of occupant traffic, to track the speed of occupant traffic, to track the volume of occupant traffic, etc. This information can be used to alert emergency responders to a panic situation, or to a large captive body of individuals. Activities occurring prior to an evacuation condition can be sensed by the infrared sensors and recorded by the evacuation system. As such, suspicious behavioral movements occurring prior to an evacuation condition can be sensed and recorded. For example, if the evacuation condition was maliciously caused, the recorded information from the infrared sensors can be used to determine how quickly the area was vacated immediately prior to the evacuation condition. Infrared sensor based occupancy detection is described in more detail in an article titled "Development of Infrared Human Sensor" in the Matsushita Electric Works (MEW) Sustainability Report 2004, the entire disclosure of which is incorporated herein by reference.

Occupancy unit 225 can also use audio detection to identify noises associated with occupants such as snoring, respiration, heartbeat, voices, etc. The audio detection can be implemented using a high sensitivity microphone which is capable of detecting a heartbeat, respiration, etc. from across a room. Any high sensitivity microphone known to those of skill in the art may be used. Upon detection of a sound, occupancy unit 225 can utilize pattern recognition to identify the sound as speech, a heartbeat, respiration, snoring, etc. Occupancy unit 225 can similarly utilize voice recognition and/or pitch tone recognition to distinguish human and non-human occupants and/or to distinguish between different human occupants. As such, emergency responders can be informed whether an occupant is a baby, a small child, an adult, a dog, etc. Occupancy unit 225 can also detect occupants using scent detection. An example sensor for detecting scent is described in an article by Jacqueline Mitchell titled "Picking Up the Scent" and appearing in the August 2008 Tufts Journal, the entire disclosure of which is incorporated herein by reference.

In one embodiment, occupancy unit 225 can also be implemented as a portable, handheld occupancy unit. The portable occupancy unit can be configured to detect human presence using audible sound detection, infrared detection, respiration detection, motion detection, scent detection, etc. as described above. Firefighters, paramedics, police, etc. can utilize the portable occupancy unit to determine whether any human is present in a room with limited or no visibility. As such, the emergency responders can quickly scan rooms and other areas without expending the time to fully enter the room and perform an exhaustive manual search. The portable occupancy unit can include one or more sensors for detecting human presence. The portable occupancy unit can also include a processor for processing detected signals as described above with reference to occupancy unit 225, a memory for data storage, a user interface for receiving user inputs, an output for conveying whether human presence is detected, etc.

In an alternative embodiment, sensory node 200 (and/or decision node 300 described with reference to FIG. 3) can be configured to broadcast occupancy information. In such an embodiment, emergency response personnel can be equipped with a portable receiver configured to receive the broadcasted occupancy information such that the responder knows where any humans are located with the structure. The occupancy information can also be broadcast to any other type of receiver. The occupancy information can be used to help rescue individuals in the event of a fire or other evacuation condition. The occupancy information can also be used in the event of a kidnapping or hostage situation to identify the number of victims involved, the number of perpetrators involved, the locations of the victims and/or perpetrators, etc.

Transceiver 230 can include a transmitter for transmitting information and/or a receiver for receiving information. As an example, transceiver 230 of sensory node 200 can receive status information, occupancy information, evacuation condition information, etc. from a first sensory node and forward the information to a second sensory node or to a decision node. Transceiver 230 can also be used to transmit information corresponding to sensory node 200 to another sensory node or a decision node. For example, transceiver 230 can periodically transmit occupancy information to a decision node such that the decision node has the occupancy information in the event of an evacuation condition. Alternatively, transceiver 230 can be used to transmit the occupancy information to the decision node along with an indication of the evacuation condition. Transceiver 230 can also be used to receive instructions regarding appropriate evacuation routes and/or the evacuation routes from a decision node. Alternatively, the evacuation routes can be stored in memory 215 and transceiver 230 may only receive an indication of which evacuation route to convey.

Warning unit 235 can include a speaker and/or a display for conveying an evacuation route or routes. The speaker can be used to play an audible voice evacuation message. The evacuation message can be conveyed in one or multiple languages, depending on the embodiment. If multiple evacuation routes are used based on occupancy information or the fact that numerous safe evacuation routes exist, the evacuation message can include the multiple evacuation routes in the alternative. For example, the evacuation message may state "please exit to the left through stairwell A, or to the right through stairwell B." The display of warning unit 235 can be used to convey the evacuation message in textual form for deaf individuals or individuals with poor hearing. Warning unit 235 can further include one or more lights to indicate that an evacuation condition has been detected and/or to illuminate at least a portion of an evacuation route. In the event of an evacuation condition, warning unit 235 can be configured to repeat the evacuation message(s) until a stop evacuation message instruction is received from a decision node, until the evacuation system is reset or muted by a system administrator or other user, or until sensory node 200 malfunctions due to excessive heat, etc. Warning unit 235 can also be used to convey a status message such as "smoke detected in room thirty-five on the third floor." The status message can be played one or more times in between the evacuation message. In an alternative embodiment, sensory node 200 may not include warning unit 235, and the evacuation route(s) may be conveyed only by decision nodes. The evacuation condition may be detected by sensory node 200, or by any other node in direct or indirect communication with sensory node 200.

Processor 240 can be operatively coupled to each of the components of sensory node 200, and can be configured to control interaction between the components. For example, if an evacuation condition is detected by sensor(s) 205, processor 240 can cause transceiver 230 to transmit an indication of the evacuation condition to a decision node. In response, transceiver 230 can receive an instruction from the decision node regarding an appropriate evacuation message to convey. Processor 240 can interpret the instruction, obtain the appropriate evacuation message from memory 215, and cause warning unit 235 to convey the obtained evacuation message. Processor 240 can also receive inputs from user interface 220 and take appropriate action. Processor 240 can further be used to process, store, and/or transmit occupancy information obtained through occupancy unit 225. Processor 240 can further be coupled to power source 210 and used to detect and indicate a power failure or low battery condition. In one embodiment, processor 240 can also receive manually generated alarm inputs from a user through user interface 220. As an example, if a fire is accidently started in a room of a structure, a user may press an alarm activation button on user interface 220, thereby signaling an evacuation condition and activating warning unit 235. In such an embodiment, in the case of accidental alarm activation, sensory node 200 may inform the user that he/she can press the alarm activation button a second time to disable the alarm. After a predetermined period of time (i.e., 5 seconds, 10 seconds, 30 seconds, etc.), the evacuation condition may be conveyed to other nodes and/or an emergency response center through the network.

Figure 3:
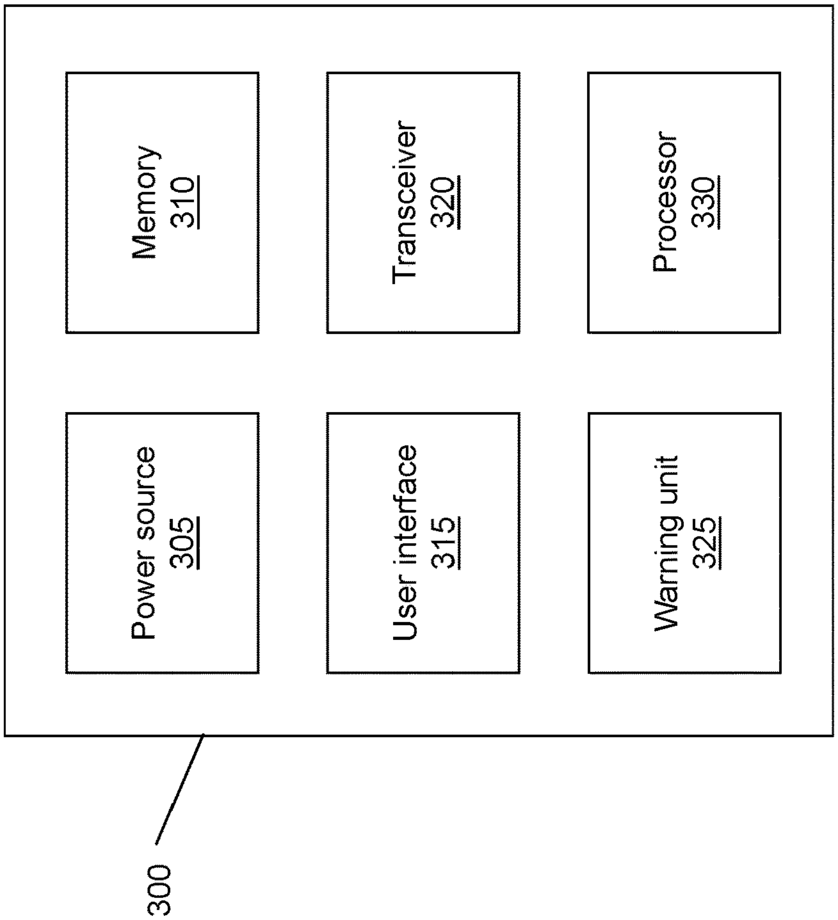
FIG. 3 is a block diagram illustrating a decision node in accordance with an illustrative embodiment.

FIG. 3 is a block diagram illustrating a decision node 300 in accordance with an exemplary embodiment. In alternative embodiments, decision node 300 may include additional, fewer, and/or different components. Decision node 300 includes a power source 305, a memory 310, a user interface 315, a transceiver 320, a warning unit 325, and a processor 330. In one embodiment, decision node 300 can also include sensor(s) and/or an occupancy unit as described with reference to sensory unit 200 of FIG. 2. In an illustrative embodiment, power source 305 can be the same or similar to power source 210 described with reference to FIG. 2. Similarly, user interface 315 can be the same or similar to user interface 220 described with reference to FIG. 2, and warning unit 325 can be the same or similar to warning unit 235 described with reference to FIG. 2.

Memory 310 can be configured to store a layout of the structure(s) in which the evacuation system is located, information regarding the locations of sensory nodes and other decision nodes, information regarding how to contact an emergency response center, occupancy information, occupancy detection and monitoring algorithms, and/or an algorithm for determining an appropriate evacuation route. Transceiver 320, which can be similar to transceiver 230 described with reference to FIG. 2, can be configured to receive information from sensory nodes and other decision nodes and to transmit evacuation routes to sensory nodes and/or other decision nodes. Processor 330 can be operatively coupled to each of the components of decision node 300, and can be configured to control interaction between the components.

In one embodiment, decision node 300 can be an exit sign including an EXIT display in addition to the components described with reference to FIG. 3. As such, decision node 300 can be located proximate an exit of a structure, and warning unit 325 can direct individuals toward or away from the exit depending on the identified evacuation route(s). In an alternative embodiment, all nodes of the evacuation system may be identical such that there is not a distinction between sensory nodes and decision nodes. In such an embodiment, all of the nodes can have sensor(s), an occupancy unit, decision-making capability, etc.

Figure 4:
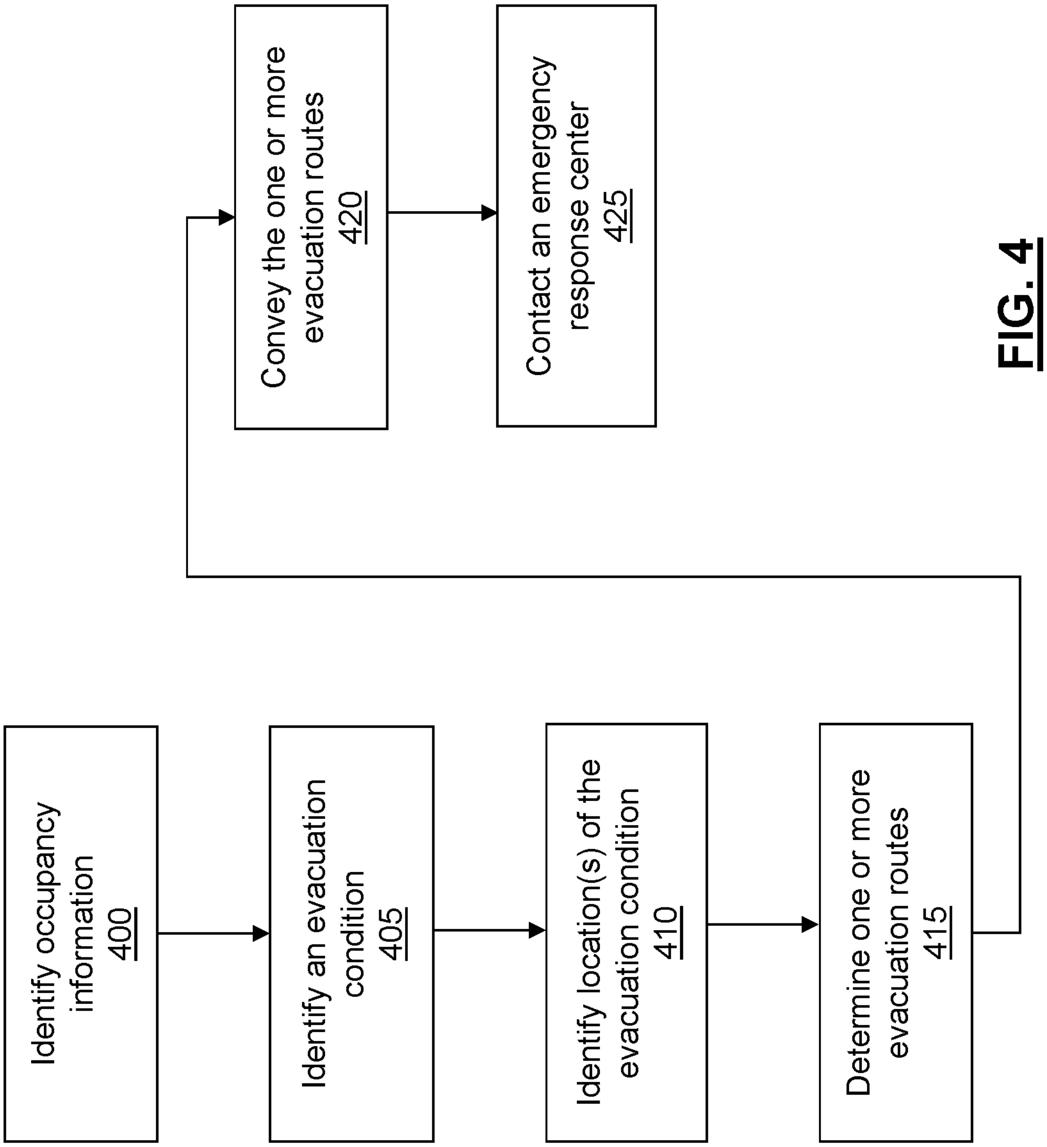
FIG. 4 is a flow diagram illustrating operations performed by an evacuation system in accordance with an illustrative embodiment.

FIG. 4 is a flow diagram illustrating operations performed by an evacuation system in accordance with an illustrative embodiment. In alternative embodiments, additional, fewer, and/or different operations may be performed. Further, the use of a flow diagram is not meant to be limiting with respect to the order of operations performed. Any of the operations described with reference to FIG. 4 can be performed by one or more sensory nodes and/or by one or more decision nodes. In an operation 400, occupancy information is identified. The occupancy information can include information regarding a number of individuals present at a given location at a given time (i.e., current information). The occupancy information can also include occupancy patterns based on long term monitoring of the location. The occupancy information can be identified using occupancy unit 225 described with reference to FIG. 2 and/or by any other methods known to those of skill in the art. The occupancy information can be specific to a given node, and can be determined by sensory nodes and/or decision nodes.

In an operation 405, an evacuation condition is identified. The evacuation condition can be identified by a sensor associated with a sensory node and/or a decision node. The evacuation condition can result from the detection of smoke, heat, toxic gas, etc. A decision node can receive an indication of the evacuation condition from a sensory node or other decision node. Alternatively, the decision node may detect the evacuation condition using one or more sensors. The indication of the evacuation condition can identify the type of evacuation condition detected and/or a magnitude or severity of the evacuation condition. As an example, the indication of the evacuation condition may indicate that a high concentration of carbon monoxide gas was detected.

In an operation 410, location(s) of the evacuation condition are identified. The location(s) can be identified based on the identity of the node(s) which detected the evacuation condition. For example, the evacuation condition may be detected by node A. Node A can transmit an indication of the evacuation condition to a decision node B along with information identifying the transmitter as node A. Decision node B can know the coordinates or position of node A and use this information in determining an appropriate evacuation route. Alternatively, node A can transmit its location (i.e., coordinates or position) along with the indication of the evacuation condition.

In an operation 415, one or more evacuation routes are determined. In an illustrative embodiment, the one or more evacuation routes can be determined based at least in part on a layout of the structure, the occupancy information, the type of evacuation condition, the severity of the evacuation condition, and/or the location(s) of the evacuation condition. In an illustrative embodiment, a first decision node to receive an indication of the evacuation condition or to detect the evacuation condition can be used to determine the evacuation route(s). In such an embodiment, the first decision node to receive the indication can inform any other decision nodes that the first decision node is determining the evacuation route(s), and the other decision nodes can be configured to wait for the evacuation route(s) from the first decision node. Alternatively, multiple decision nodes can simultaneously determine the evacuation route(s) and each decision node can be configured to convey the evacuation route(s) to a subset of sensory nodes. Alternatively, multiple decision nodes can simultaneously determine the evacuation route(s) for redundancy in case any one of the decision nodes malfunctions due to the evacuation condition. In one embodiment, each decision node can be responsible for a predetermined portion of the structure and can be configured to determine evacuation route(s) for that predetermined portion or area. For example, a first decision node can be configured to determine evacuation route(s) for evacuating a first floor of the structure, a second decision node can be configured to determine evacuation route(s) for evacuating a second floor of the structure, and so on. In such an embodiment, the decision nodes can communicate with one another such that each of the evacuation route(s) is based at least in part on the other evacuation route(s).

As indicated above, the one or more evacuation routes can be determined based at least in part on the occupancy information. As an example, the occupancy information may indicate that approximately 50 people are located in a conference room in the east wing on the fifth floor of a structure and that 10 people are dispersed throughout the third floor of the structure. The east wing of the structure can include an east stairwell that is rated for supporting the evacuation of 100 people. If there are no other large groups of individuals to be directed through the east stairwell and the east stairwell is otherwise safe, the evacuation route can direct the 50 people toward the east stairwell, down the stairs to a first floor lobby, and out of the lobby through a front door of the structure. In order to prevent congestion on the east stairwell, the evacuation route can direct the 10 people from the third floor of the structure to evacuate through a west stairwell assuming that the west stairwell is otherwise safe and uncongested. As another example, the occupancy information can be used to designate multiple evacuation routes based on the number of people known to be in a given area and/or the number of people expected to be in a given area based on historical occupancy patterns.

The one or more evacuation routes can also be determined based at least in part on the type of evacuation condition. For example, in the event of a fire, all evacuation routes can utilize stairwells, doors, windows, etc. However, if a toxic gas such as nitrogen dioxide is detected, the evacuation routes may utilize one or more elevators in addition to stairwells, doors, windows, etc. For example, nitrogen dioxide may be detected on floors 80-100 of a building. In such a situation, elevators may be the best evacuation option for individuals located on floors 90-100 to evacuate. Individuals on floors 80-89 can be evacuated using a stairwell and/or elevators, and individuals on floors 2-79 can be evacuated via the stairwell. In an alternative embodiment, elevators may not be used as part of an evacuation route. In one embodiment, not all evacuation conditions may result in an entire evacuation of the structure. An evacuation condition that can be geographically contained may result in a partial evacuation of the structure. For example, nitrogen dioxide may be detected in a room on the ground floor with an open window, where the nitrogen dioxide is due to an idling vehicle proximate the window. The evacuation system may evacuate only the room in which the nitrogen dioxide was detected. As such, the type and/or severity of the evacuation condition can dictate not only the evacuation route, but also the area to be evacuated.

The one or more evacuation routes can also be determined based at least in part on the severity of the evacuation condition. As an example, heat may detected in the east stairwell and the west stairwell of a structure having only the two stairwells. The heat detected in the east stairwell may be 120 degrees Fahrenheit (F) and the heat detected in the west stairwell may be 250 degrees F. In such a situation, if no other options are available, the evacuation routes can utilize the east stairwell. The concentration of a detected toxic gas can similarly be used to determine the evacuation routes. The one or more evacuation routes can further be determined based at least in part on the location(s) of the evacuation condition. As an example, the evacuation condition can be identified by nodes located on floors 6 and 7 of a structure and near the north stairwell of the structure. As such, the evacuation route for individuals located on floors 2-5 can utilize the north stairwell of the structure, and the evacuation route for individuals located on floors 6 and higher can utilize a south stairwell of the structure.

In an operation 420, the one or more evacuation routes are conveyed. In an illustrative embodiment, the one or more evacuation routes can be conveyed by warning units of nodes such as warning unit 235 described with reference to FIG. 2 and warning unit 325 described with reference to FIG. 3. In an illustrative embodiment, each node can convey one or more designated evacuation routes, and each node may convey different evacuation route(s). Similarly, multiple nodes may all convey the same evacuation route(s). In an operation 425, an emergency response center is contacted. The evacuation system can automatically provide the emergency response center with occupancy information, a type of the evacuation condition, a severity of the evacuation condition, and/or the location(s) of the evacuation condition. As such, emergency responders can be dispatched immediately. The emergency responders can also use the information to prepare for the evacuation condition and respond effectively to the evacuation condition.

Many implementations can be conceived to execute the systems, methods, and computer readable mediums for enhanced emergency detection disclosed herein. Various combinations of hardware or software components, or a combination of hardware and software components, may be used. In an illustrative embodiment, one of those components may be a wireless stack to support an enhanced emergency detection system. Many other types of communication systems may be used to practice the invention. A variety of sensors can also be used in the implementation of the embodiments disclosed herein. Sensors and nodes may include a blue LED, an amplified speaker, an optical smoke sensor, a temperature sensor, an ultrasonic activity sensor, bidirectional wireless radio frequency (RF) communication capabilities, batteries, alternating current (AC) power, or cellular or Ethernet communication capabilities.

In an illustrative embodiment, an existing stack, such as Open Wireless Sensor Network (OpenWSN), may be used.

For reference, the OpenWSN framework may include the following standards at each layer:

- Physical Layer (PHY): Institute of Electrical and Electronics Engineers (IEEE) 802.15.4-2006
- Medium Access Control (MAC): 802.15.4e Timeslotted Channel Hopping (TSCH)
- ROUTING: Routing Protocol for Low-Power and Lossy Networks (RPL)
- ADAPTATION: Internet Protocol version 6 (IPv6) over Low power Wireless Personal Area Networks (6LoWPAN)
- NETWORK: Internet Protocol version 6 (IPv6)
- TRANSPORT: User Datagram Protocol (UDP)

Alternatively, other protocols or systems may also be used. Other protocols or systems may also be used in conjunction with only some aspects of OpenWSN. For example, the RPL routing may not be used. Instead, routing information may be sent in a link layer header. The routing may also incorporate geometric routing, which involves nodes choosing coordinates in a virtual coordinate space.

In an illustrative embodiment, an OpenWSN framework may include a link layer that is compliant with the IEEE 802.15.4e standard. RF wireless communications in the system may also be encrypted. Further, RF wireless communications in the system may also comply with other standards, such as Z-Wave wireless protocol or Zigbee wireless protocol. A schedule may also be included in enhanced beacons. A header format for defining schedules in a beacon may also be added. As an example, a headerIE (header Information Element) type that carries a reduced size schedule format that may allow a node to more efficiently store schedules of neighboring nodes may be used. The header type may store the frame length and slot information in 2 bytes, for example. The new type also includes a schedule lifetime, after which the schedule is invalid. The header may also contain channel hopping information. The channel hopping information may include a mask of channels currently skipped on that node because the node has learned that those channels are noisy.

As an illustrative example of how schedule lifetimes may be employed, schedules may be used by a node in an enhanced emergency detection system in the following manner. Upon joining a network, a node's schedule lifetime will be short. Subsequent schedules will then have incrementally longer schedule lifetimes. In this embodiment, once a node chooses a given schedule and advertises it, the node listens on it until it expires. However, if a schedule of a node collides with another schedule, the schedule can be changed quickly because the lifetime of initial schedules used by a node will be short.

The reduced schedule description size may allow each node to store more neighbor schedules using less memory, enhancing the "meshing" capability of the network. The schedules may represent not only the means to communicate with neighboring nodes, but also the maximum throughput and latency to that node. This is valuable information to the routing layer, which may use the information to make improved routing decisions.

In another illustrative embodiment, a received signal strength indicator (RSSI) may be used as a way to inform local nodes that they should "wake up" and listen on a shared schedule. At certain times, a node may broadcast announcements to all of its neighbors at once. A node may also broadcast an announcement to more than one of its neighbors at once. In order to accomplish this, more than one node may listen on a shared schedule. However, to reduce power consumption, a node should not listen when it doesn't have to. In other words, a node may not be listening constantly. Rather, a node may only listen a certain percentage of the time, and it may listen at a particular frequency and duration. This concept may reduce power consumption when connected to a power supply. In the context of a battery powered device, this may result in longer battery life.

Instructions may be provided that instruct a node on when and how to listen. For example, if a node has not received a signal to "wake up," the node may listen less. Upon receiving a signal to "wake up," the node may listen on the shared listening schedule. Alternatively, the "wake up" broadcast packet could activate a third listening schedule. Any given node may also be capable of transmitting a "wake up" signal to the other nodes within range. A node's listening schedule before receiving a "wake up" signal may be a reduced duty cycle shared listening schedule (for example, 1 Hz), and, upon receiving a "wake up" broadcast packet on this schedule, the node may switch to an increased duty cycle schedule (for example, 8 Hz) to receive the packet(s) from another node. For example, a node may have a 0.2% radio duty cycle for 1 second periodic wake up.

If two nodes transmit a "wake up" broadcast packet at the same time, a collision may result at a receiving node. This may hinder the nodes ability to receive the "wake up" packet and effectively "wake up," change listening schedules, and receive announcements from another node. In an illustrative embodiment, an RSSI may be used in conjunction with reduced listening schedule to detect that one or more nodes request a "wake up." In this example, the content of the transmitted "wake up" packet may not be relevant. It may only be relevant that the RSSI receives radio activity from one or more "wake up" packets, which can be used to cause the node to "wake up" and use a different listening schedule as outlined above. In this embodiment, the collision of two or more "wake up" packets will not prevent a node from changing listening schedules to receive announcements from other nodes. The RSSI may show radio activity regardless of the number of nodes transmitting simultaneously.

In another illustrative embodiment a 6LoWPAN adaptation layer may be used. This may be configured to be up to date with the latest Internet Engineering Task Force (IETF) proposed standard (Request for Comment (RFC) 4944, RFC 6282). The routing layer may initially be RPL, a proposed low power routing standard from the IETF Routing Over Low power and Lossy networks (ROLL) working group. It may be modified to use hints from the 802.15.4e link layer (as stated above) to make better decisions.

OpenWSN may use a serial port to stream packets from the network to a computer, where the packets are adapted from 6LoWPAN compressed packets to IPv6 packets. In another embodiment, an Ethernet port may be installed on the bridge nodes. This may allow the nodes to directly communicate with the wired network and internet. The node will also have the ability to be powered via the network port using Power over Ethernet (PoE). Additionally, Endian relation errors may be corrected. Specific MSPGCC make file changes may be made to allow the code to be compiled using the MSPGCC specifics. MSPGCC is a port of the GNU C compiler for compiling code to Texas Instruments MSP processors. Other build files may be IAR Systems compiler specific.

Also described herein are ways of finding smoke detector signals and timing for extracting continuous fire detection data therefrom. Other devices than a smoke detector may be used in alternative embodiments. In one embodiment, an Apollo band smoke detector is used, although alternatively other smoke detectors may be used. One Apollo smoke detector that may be used is the model UTC/GE 560N-570N smoke alarm. Discussed herein are how, on a Apollo brand smoke detector circuit board, analog smoke and temperature analog signals may be obtained and streamed through a node to other nodes, the internet, or some other device. The analog signals may not be continuously available from the sensors or components in the smoke detector, so the location and nature of digital timing signals used by the smoke detector may also be noted. This may occur because a smoke detector may only activate sensors and other components in the smoke detector at certain times, frequencies, or durations in order to reduce power consumption of these components. Knowing the timing of the digital timing signals may be used to read the analog signals at the appropriate time. On any equipment or components used to obtain, stream, or sense the analog signals and digital timing signals present in the smoke detector, the equipment, components, or signals may be buffered so as not to load down and change the analog signals and digital timing signals present in the smoke detector. All desired signals were located and the nature of their circuitry noted to help plan buffering.

For example, in the Apollo brand smoke detector operation, the detector is battery operated. Its temperature and smoke detector circuits may be powered up every 4 seconds instead of being powered continuously. This rate may not change when smoke is detected. This operation may be used to reduce power consumption and extend battery life in the smoke detector. As such, it may be useful to use the method described above. Using the digital timing signals as a guide for when to stream the analog signals in the smoke detector may further reduce power consumption and extend battery life. For example, in one embodiment, five 2.4 amp-hour (Ah) manganese dioxide lithium batteries may be used in an enhanced emergency detection system node and may last for five years before needing replacement, assuming quiescent conditions.

Figure 5:
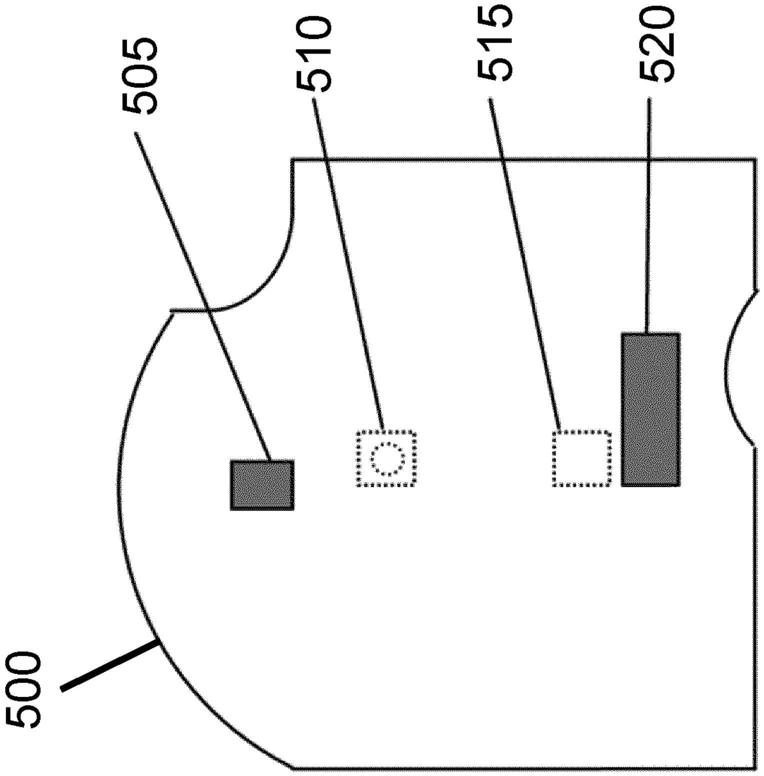
FIG. 5 is a diagram illustrating a smoke detector main board in accordance with an illustrative embodiment.

As an illustrative example, a smoke detector main board is illustrated in FIG. 5. A smoke detector may contain two boards: a main board and a plug-in wireless module. The analog and digital timing signals may all be present on the main board. A TI (Texas Instruments) MSP430 microcontroller may be used as the processor of the smoke detector.

An example layout of a main board is shown in FIG. 5. In alternative embodiments, other layouts may be used. In FIG. 5, electrical interconnects between components of the main board are not shown. Certain components shown in FIG. 5 may not be present on the main board in other embodiments. Similarly, other components not shown in FIG. 5 may be present on the main board in other embodiments. The main board 500 is shown. Disposed on the main board 500 is a DC-DC converter/horn driver 505, an infrared light emitting diode (IRLED) 510, a photo detector 515, and a micro controller 520. The infrared light emitting diode 510 and the photo detector 515 are shown in FIG. 5 as dashed lines because they may be disposed on the opposite side of main board 500 from the DC-DC converter/horn driver 505 and the micro controller 520.

Figure 6:
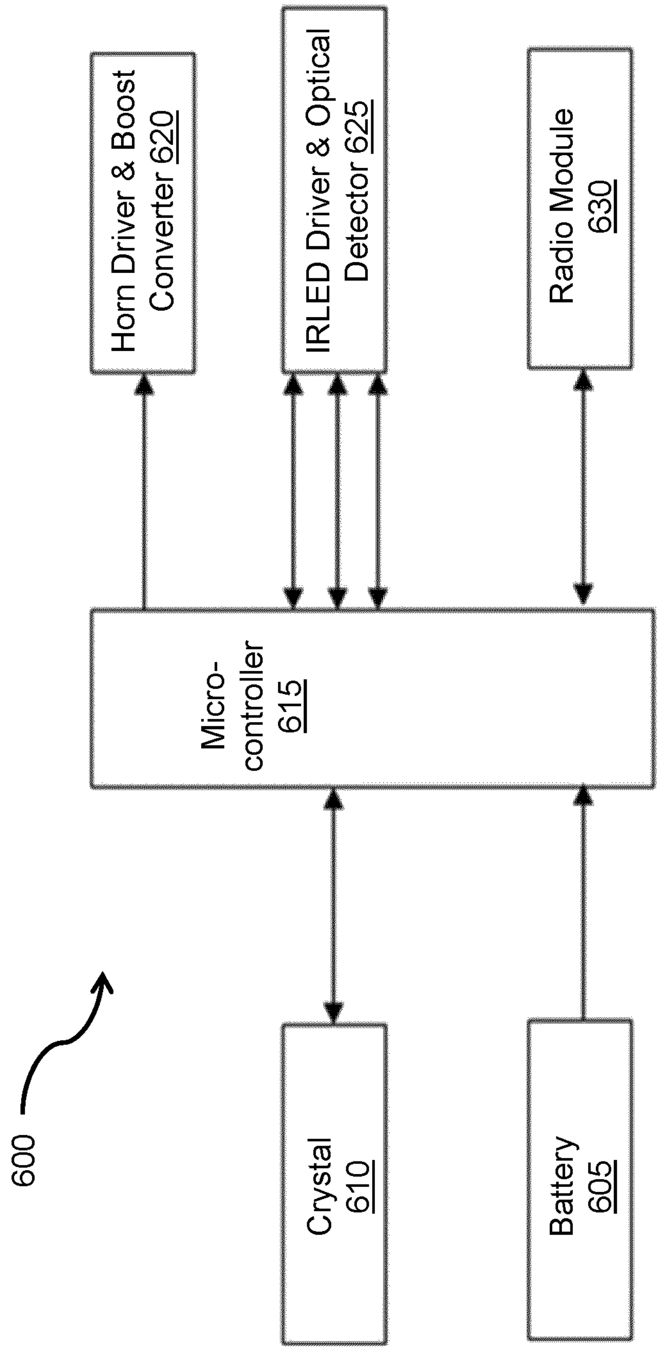
FIG. 6 is a block diagram illustrating how components of a smoke detector may be interconnected in accordance with an illustrative embodiment.

An example of how the components of a smoke detector may be interconnected is shown in FIG. 6. FIG. 6 shows a smoke detector block diagram 600. The arrows in FIG. 6 indicate where electrical connections may be present and the direction signals may be sent in this embodiment. It shows a battery 605. The battery 605 supplies power to the microcontroller 615. The microcontroller 615 is connected to a crystal 610, such as a 32.768 kilohertz (kHZ) oscillating crystal. This crystal 610 may assist in timing functions for the microcontroller 615. The microcontroller 615 may send a signal or supply a voltage to the crystal 610 to cause it to oscillate. The crystal 610 does not stop running during sensor sampling in this embodiment. The microcontroller 615 is also connected to a horn driver and boost converter 620. A signal can be sent from the microcontroller 615 to the horn driver and boost converter 620 to sound a horn. The microcontroller 615 is also connected an IRLED driver and optical detector 625. This IRLED driver and optical detector 625 may provide information to the microcontroller 625 such as smoke levels of a surrounding environment. The microcontroller 625 may also be connected to a radio module 630. This radio module 630 can provide the link to other nodes in the system, to the internet, a local network, or other sort of connection using radio waves as described using protocols and procedures above. Similarly, the microcontroller 625 may receive signals from other nodes via the radio module 630, such as a "wake up" signal or announcement as described above.

Many other embodiments of the components of FIG. 6 are possible and contemplated. The battery 605 could be multiple batteries in alternative embodiments. For example, it may be three AAA size batteries. The battery 605 could also be another form of power supply in other embodiments, such as power from a circuit in a structure, through an AC adapter, through a USB port, or through an Ethernet connection. The crystal 610 may include other electrical components such as resistors and transistors that help it oscillate correctly for use by the microcontroller 615. The IRLED driver and optical detector 625 may include an IR detector, an IRLED, or a photo detector. Alternatively, a node may also have a thermistor resistive divider, or many other sensors relevant for emergency or occupancy detection.

As an example of where the location of signals on a circuit board may be located on an Apollo brand smoke detector, Table 1 is shown.

TABLE 1

| Signal functions | Device/pin | Signal type | Notes |
|---|---|---|---|
| IR detector/ thermistor enable | Detector/2 | Logic | Read temperature right away once enabled |
| IRLED power | Detector/3 | Logic | Read smoke right after LED is turned off. This signal can be used to trigger the reading of both analog signals. |
| Photo detector output | Detector/4 | Analog | Signal is available after trailing edge of IRLED power above. |
| Thermistor resistive divider | Micro/22 | Analog | Small signal: 120 mV (milliVolts) at room temperature. |

In the illustrative embodiment shown in Table 1, there may be a variety of signals on a circuit board. The signals may vary in location, type, or function in other embodiments. The "Notes" column of Table 1 indicates how the signals may be read in an illustrative embodiment.

The infrared (IR) detector/thermistor enable function may be read as soon as it is enabled. The IRLED power may be monitored to determine when to read the photo detector output and thermistor resistive divider analog signals. In this embodiment, the photo detector output and thermistor resistive divider analog signals can be read as soon as the LED is turned off.

Graphical examples of how this timing may work can be seen in the embodiments of the signals in FIGS. 7-10.

Figure 7:
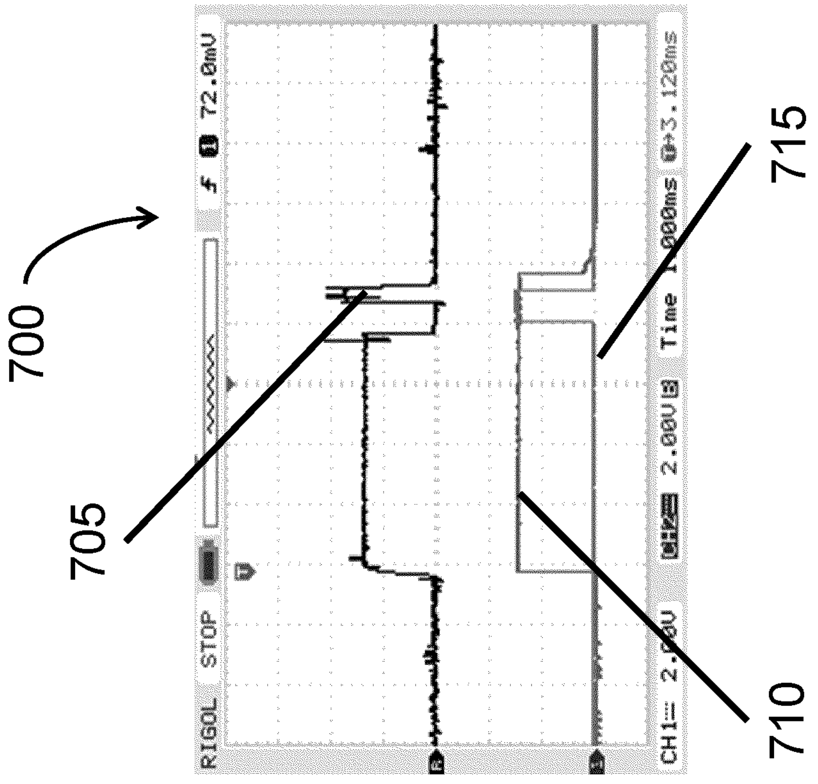
FIG. 7 is a graph diagram illustrating signals representing sensor timing in a smoke detector in accordance with an illustrative embodiment.

FIG. 7 shows a graph 700 of three signals. First, the graph 700 shows the power-up/enable signal 710 for the sensing circuits. The signal 710 supplies power to the sensors like a photo detector. The power signal may be active or switched on for 5 milliseconds (ms), for example. A 5 ms Power-on Pulse and LED drive may be used. The output of a photo detector output signal 705 is also shown on graph 700. Additionally, the IRLED power signal 715 is shown on graph 700. As indicated in Table 1 above, the IRLED power signal 715 is switched on, and as it is trailed off, the photo detector output signal 705 is available.

Figure 8:
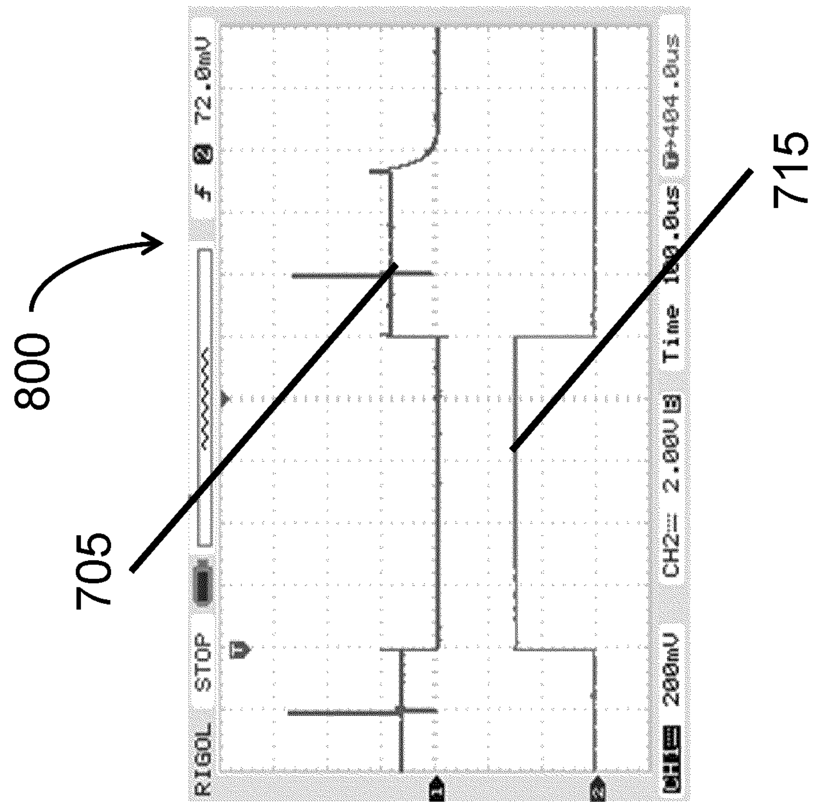
FIG. 8 is a graph diagram illustrating another view of signals representing sensor timing in a smoke detector in accordance with an illustrative embodiment.

This is further shown in FIG. 8, as it shows a magnified graph 800 of the IRLED power signal 715 and the photo detector output signal 705.

Figure 9:
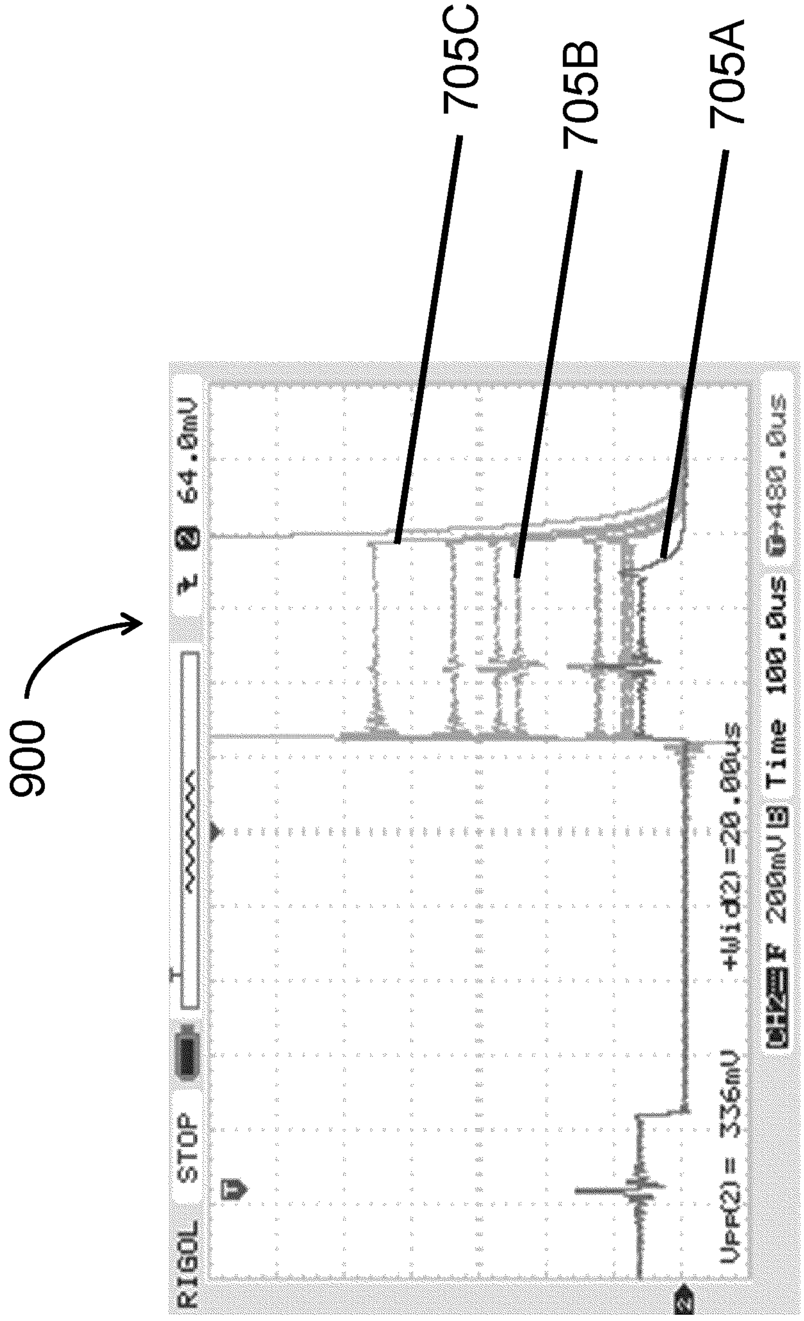
FIG. 9 is a graph diagram illustrating signals representing photo detector outputs in a smoke detector in accordance with an illustrative embodiment.

FIG. 9 shows a graph 900 of different photo detector output signals 705. These varying signals may indicate varying smoke densities. Graph 900 indicates a photo detector output 705A that demonstrates an output with no smoke. It also demonstrates, for example, photo detector outputs 705B and 705C that indicate increasingly higher levels of smoke density.

Figure 10:
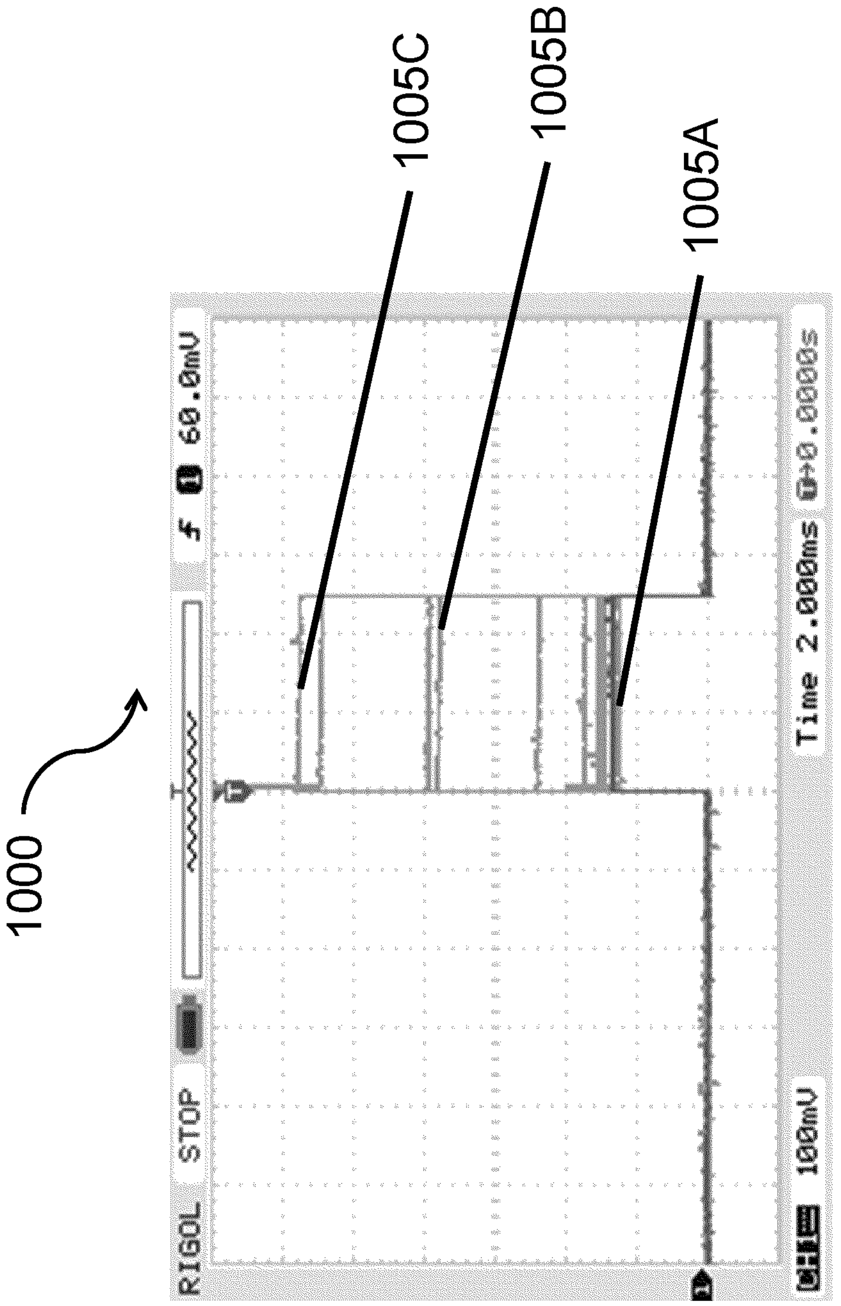
FIG. 10 is a graph diagram illustrating signals representing thermistor outputs in a smoke detector in accordance with an illustrative embodiment.

FIG. 10 shows a graph 1000 that demonstrates the analog outputs of a thermistor signal 1005, which also corresponds with a signal outlined in Table 1. Similar to photo detector output 705, the thermistor signal 1005 can be available when the IRLED power signal 715 has trailed off. Thermistor signal 1005 shows increasingly higher signals as temperature increases. Thermistor signal 1005A shows a signal at room temperature. Thermistor signals 1005B and 1005C show increasingly higher signals as temperatures increase in the environment around the thermistor.

In the illustrative embodiment using an Apollo brand smoke detector demonstrated by FIGS. 5-10 and Table 1, reading the analog signals from the components in the Apollo brand smoke detector may cause unwanted capacitive and resistive loading to the analog signals. This may be unwanted because the magnitude of the analog signals indicate particular temperatures, smoke levels, or other values that are relevant for determining an emergency condition or occupancy information. If capacitive or resistive loading is added to the signals, they may no longer accurately reflect the temperature, smoke level, or other sensor values.

One way to prevent negatively impacting the analog signals is to buffer the signals in order to minimize the impact when reading the analog signals, which may maintain accuracy of the analog signals and the readings.

Figure 11:
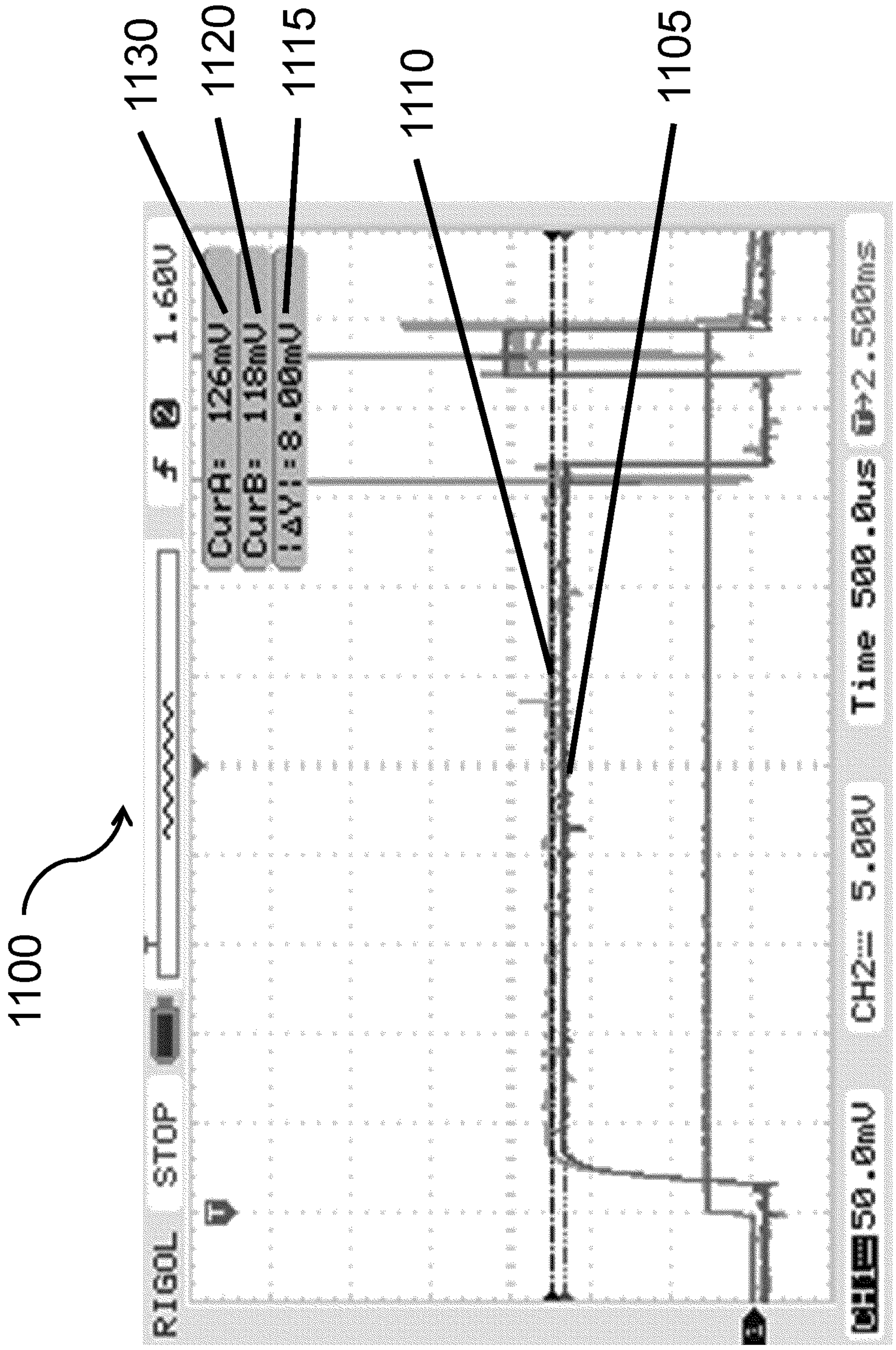
FIG. 11 is a graph diagram illustrating signals representing measurements used to calculate an impedance of a photo detector output in accordance with an illustrative embodiment.

As an illustrative example, an impedance of an analog signal may be determined so that circuit components designed to read the analog signal may be properly designed to buffer the signal. For example, FIG. 11 demonstrates a calculation of an approximate impedance of the gated analog photo detector output of an Apollo brand smoke detector corresponding to pin 4 in Table 1. Graph 1100 shows measurements and an output change of the signal with a 10,000 (10 k) Ohm (Ω) resistor load. Graph 1100 also shows the change in voltage 1115 between the signals with and without the 10 k Ω load to be 8 millivolts (mV). Graph 1100 shows a signal 1110 without the added 10 k Ω load having a voltage 1130 of 126 mV. Graph 1100 also shows a signal 1105 with the added 10 k Ω load having a voltage 1120 of 118 mV.

These measurements can be used to determine an approximate impedance of the photo detector output. In the illustrative measurements of FIG. 11, this would yield an approximate impedance of 600Ω. The formula yielding the approximate impedance is shown in Equation (1) below:

$$Z=(Vo_1-Vo_2)/(Vo_2/10\ \mathrm{k}\Omega) \qquad (1)$$

where Z is the impedance of 600Ω; $Vo_1$ is 126 mV, the voltage of signal 1130; and $Vo_2$ is 118 mV, the voltage of signal 1105.

Figure 12:
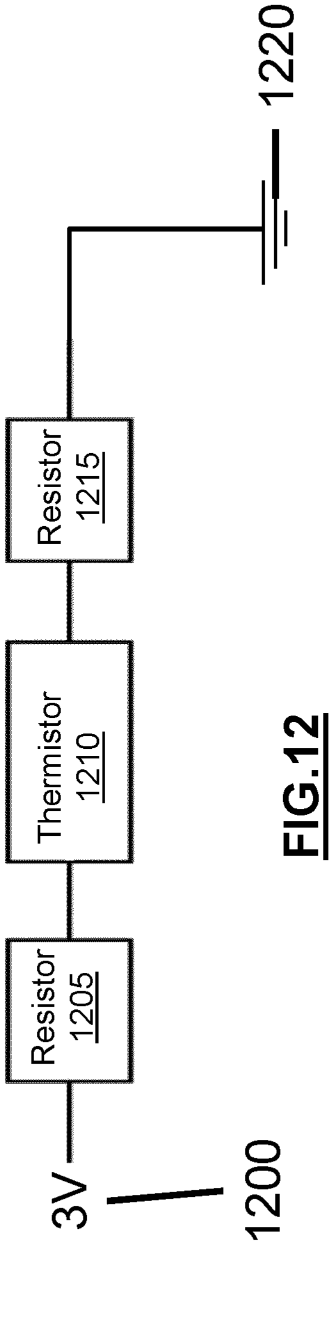
FIG. 12 is a block diagram illustrating components of a thermistor resistive divider in accordance with an illustrative embodiment.

In an illustrative embodiment, analog signals from a thermistor resistive divider may also be read. FIG. 12 shows an example of such a device, and where the signal may be read from. FIG. 12 demonstrates a power supply 1200 of 3 Volts (V). This provides power to a resistor 1205. In this case, the resistor 1205 may be a 24 k Ω resistor. The resistor is also connected to a thermistor 1210, which is connected to a resistor 1215. This resistor may be a 6.2 k Ω resistor. The resistor 1215 is also connected to ground 1220. A reading for the thermistor resistive divider output may be taken between the thermistor 1210 and the resistor 1215.

In an illustrative embodiment, certain components may be used to buffer analog signals, including the examples of the photo detector output and thermistor resistive divider output above. In those examples, an operational amplifier (op-amp) may be effective to make a buffer for such analog signals. One effective op-amp may have a less than 1 nanoamp (nA) bias/input current. Another effective op-amp may have a less than 10 nA bias current. In a further illustrative embodiment, a dual LMV652 may be used. The LMV562 may be configured as voltage followers to buffer the analog signals. This may minimize impact to the actual analog signals. An LMV652 has a typical bias current of 80 nA, limiting the voltage offset to less than 55 uV (microvolts).

The digital signals in Table 1 are digital outputs so they may be effectively read with a high input impedance, complementary metal-oxide-semiconductor (CMOS) interface to ensure accuracy by preventing capacitive and resistive loading.

In another illustrative embodiment, antennas may be added to a node or sensor to allow the node or sensor to communicate with other nodes, sensors, or devices. One possible antenna may be made using FR 406 double-sided 0.031 inch thick printed circuit board from Armitron Corporation, a board house in Chicago. This board is what Texas Instruments uses in its CC2520 development kit board, and thus may be a useful board for creating antennas.

Figure 13:
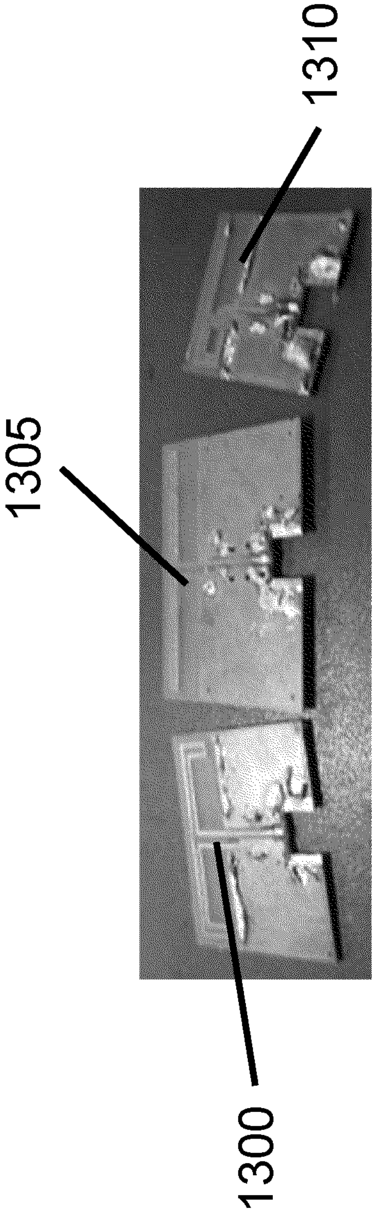
FIG. 13 is a figure illustrating possible embodiments of antennas that may be used in an enhanced emergency detection system in accordance with an illustrative embodiment.

Many different types of antennas may be used. FIG. 13 shows three possible examples. Antenna 1300 shows a bent folded dipole antenna. Antenna 1305 shows a folded dipole antenna. Antenna 1310 shows an inverted F-shape antenna. The inverted F-shape is based on a Texas Instruments design obtained manually via Gerber files into an Eagle library.

Another example of an antenna that may be used is a development board with an inverted F-shape antenna used as a receiver. For transmitting the antenna 1310 may be connected to a CC2520 radio board that may be programmed to transmit a packet every second. Additionally, the on board antenna of the CC2520 or the folded dipole antennas 1300, 1305, and 1310 may be used. The antennas 1300, 1305, and 1310 may have a range of at least 100 feet. The on-board antenna of the CC2520 may have an even higher range. The development board used as a receiver may use a 2591 pre-amp which helps increase the receiver's sensitivity. However, other embodiments may be used that do not consume as much power as a 2591 pre-amp would.

Figure 14:
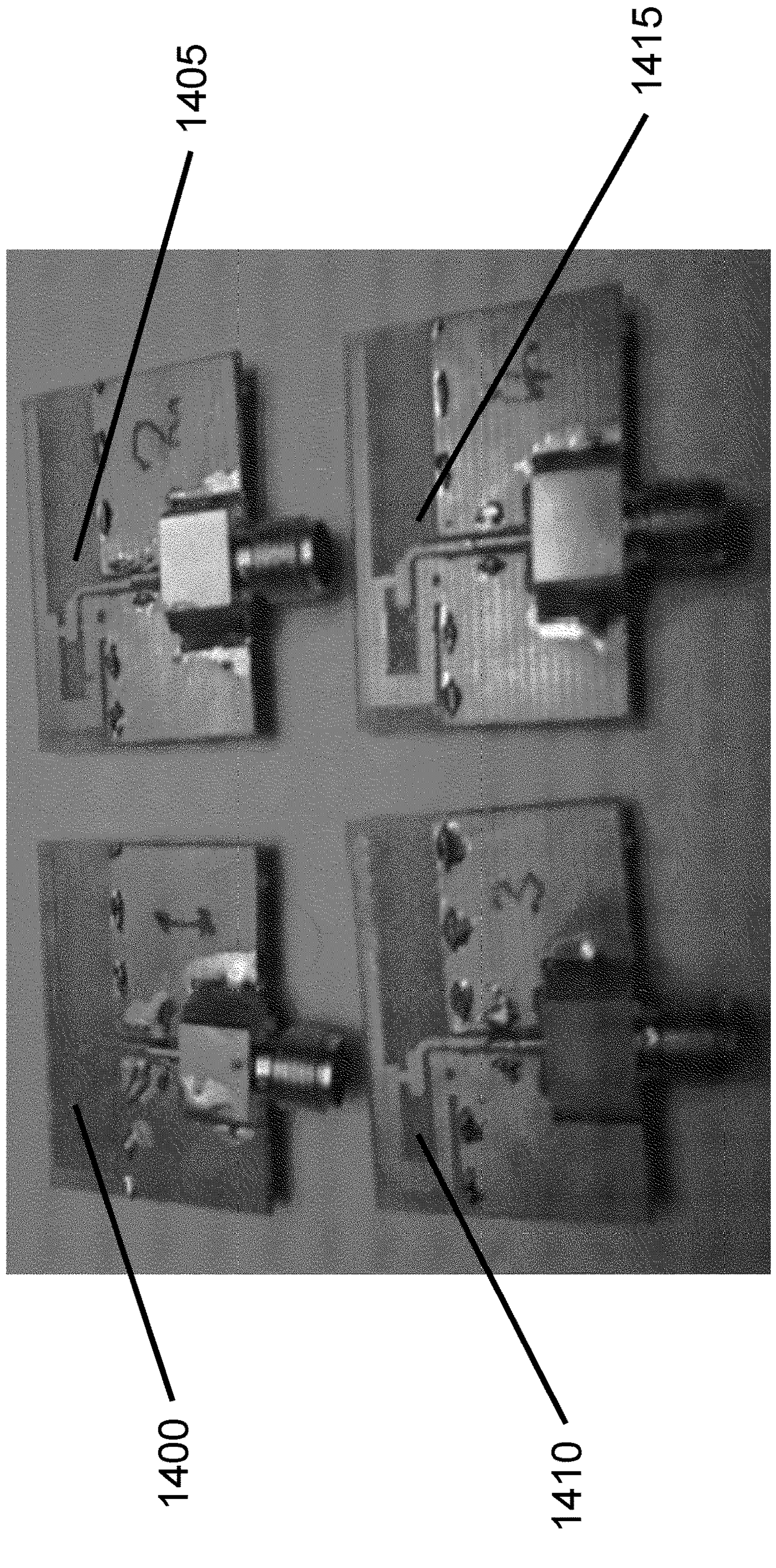
FIG. 14 is another figure further illustrating possible embodiments of antennas that may be used in an enhanced emergency detection system in accordance with an illustrative embodiment.
Figure 31:
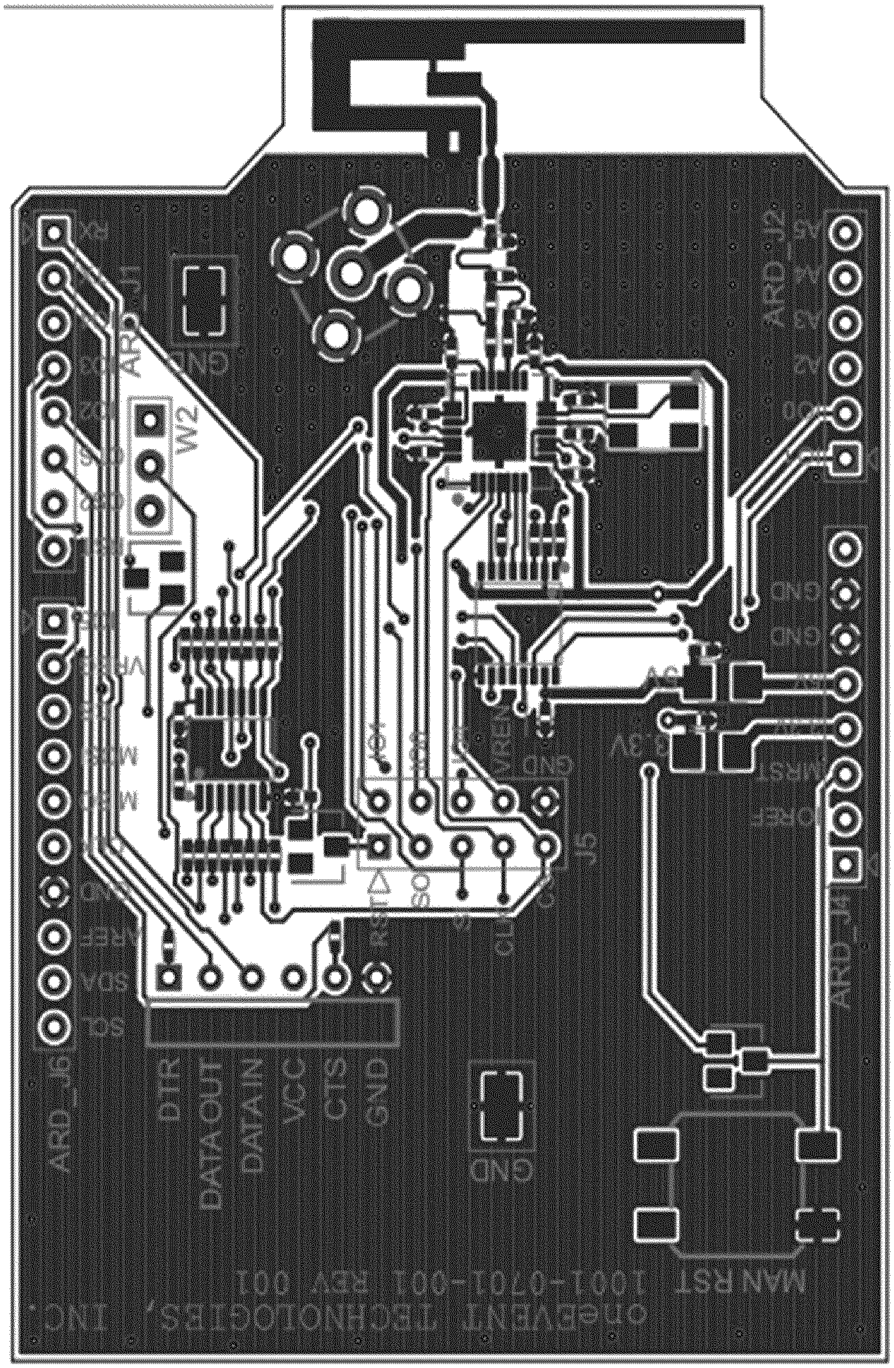
FIG. 31 is a figure illustrating a possible embodiment of an antenna that may be used in an enhanced emergency detection system in accordance with an illustrative embodiment.

FIG. 14 shows other antennas that may be used in alternative embodiments. FIG. 14 shows antennas 1400, 1405, 1410, and 1415. Each of these antennas 1400,1405, 1410, and 1415 are inverted F-shape antennas. FIG. 31 shows another possible embodiment of an inverted F-shape antenna. The difference between them is the location where the feedpoint contacts the antenna element. Antennas 1405, 1410, and 1415 have a 9 dB or 10 dB insertion loss, which is similar to the antennas shown in FIG. 13. Antenna 1400 has an insertion loss of just over 20 dB. As a result, antenna 1400 may be a configuration that better matches 50Ω, which is a common value for source and load impedances. Using this matching, an enhanced emergency detection system can use a transmission line that gets a maximum amount of energy to the other end of the line with minimal error, so the reflection is as small as possible. In other words, matching the load and line impedances so that they are equal or almost equal improves transmission accuracy.

Figure 15:
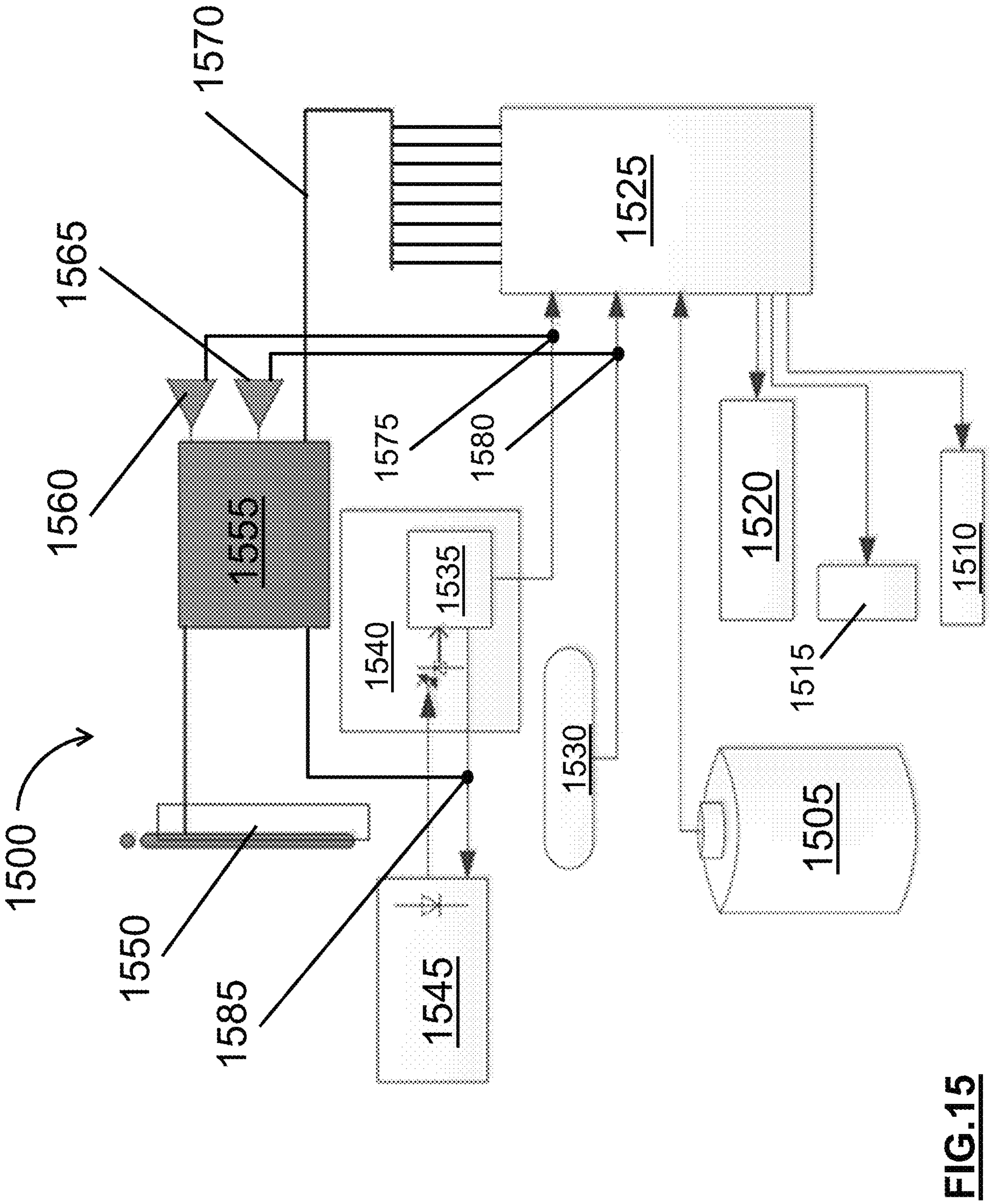
FIG. 15 is a block diagram illustrating a monitoring module and wireless controller that may be implemented in a smoke detector in accordance with an illustrative embodiment.

In another illustrative embodiment, FIG. 15 shows a monitoring module and wireless controller that can be implemented in a smoke detector. System 1500 shows a block diagram of some components and interconnects of an illustrative embodiment.

A microcontroller module 1525 is in the smoke detector system 1500. Microcontroller module 1525 may be powered by a battery 1505. The microcontroller is connected to a horn and amp 1520. This horn and amp 1520 may be an 85 dB horn and amp to effect a loud alarm during emergency conditions. Microcontroller 1525 may also be connected to an LED 1515. This LED 1515 may indicate a status of the smoke detector system 1500. The status could be radio activity. The status could indicate that the battery 1505 is still operational. The status may indicate an emergency condition. Other alternative embodiments may use the LED 1515 to indicate other varying statuses of the system 1500. The microcontroller 1525 is also connected to a push-to-test/hush button 1510. This button 1510 can be used to test the sensor and alarm, and also silence the alarm during a test or alarm condition.

The microcontroller 1525 is also connected to a temperature sensor 1530. This temperature sensor 1530 may output an analog signal to the microcontroller 1525. The temperature sensor 1530 may be a thermistor resistive divider as shown in FIG. 13.

The microcontroller 1525 is also connected to an amplifier 1535 that is part of a photoelectric smoke detector integrated circuit (IC) 1540. This photoelectric smoke detector IC 1540 is connected to a photoelectric chamber 1545. The photoelectric chamber 1545 may include a sensor and an LED. An LED in the photoelectric chamber 1545 may be powered by an LED drive from the photoelectric smoke detector IC 1540. The photoelectric chamber 1545 sends a signal to the photoelectric smoke detector IC 1540, which, together with the amplifier 1535, sends an analog signal to the microcontroller 1525 indicating the obscuration level from smoke in the environment in the photoelectric chamber 1545.

In order to integrate a system 1500 into a network as disclosed herein, a microcontroller 1555 can be added to system 1500. However, it should be appreciated that in other embodiments, microcontroller 1555 and microcontroller 1525 may be one single microcontroller. Additionally, there could be several microcontrollers or other logic circuits to effect the same results as the components shown in system 1500.

Microcontroller 1555 is connected to a lead 1585 that connects the photoelectric chamber 1545, the photoelectric smoke detector IC 1540, and the amplifier 1535. In this embodiment, the lead 1585 corresponds to the LED drive that powers up the LED in the photoelectric chamber 1545. Similar to what was discussed above in conjunction with Table 1, the LED drive power signal can be used to synchronize when the microcontroller 1555 should read other analog signals in order to conserve power. By monitoring lead 1585, microcontroller 1555 can effectively time it's reading of analog signals related to the obscuration and temperature of the environment.

In order to read the analog temperature signal, the microcontroller 1555 is connected to lead 1580 through an op amp 1565. Lead 1580 also connects to temperature sensor 1530 and microcontroller 1525. The op amp 1565 can help buffer the analog temperature signal as discussed above. In order to read the obscuration levels from smoke in the photoelectric chamber 1545, the microcontroller 1555 is connected to lead 1575 through an op amp 1560. Lead 1575 is also connected to the amplifier 1535 and the microcontroller 1525. The op amp 1560 can help buffer the analog obscuration signal as discussed above. Lead 1585 may not need to be received at microcontroller 1555 through an op amp because, as noted in Table 1, the LED drive signal is digital as opposed to analog, and is therefore less sensitive to capacitive and resistive loading.

The microcontroller 1555 is also connected to an antenna 1550. This antenna 1550 may be a 2.4 gigahertz (gHz) antenna. The antenna 1550 may also be an antenna discussed above, like those seen in FIGS. 13 and 14. Through this antenna 1550, the microcontroller 1555 may communicate to another system 1500 or any other type of device capable of wireless communication. The microcontroller 1555 may also receive communications from another system 1500 or any other device capable of wireless communication through antenna 1550.

Additionally, the microcontroller is connected to an OEM (original equipment manufacturer) alarm/fault/power interface bus 1570. This may allow microcontroller 1555 to tie into or monitor other functions of microcontroller 1525 and the smoke detector system 1500. These functions that are part of the OEM alarm/fault/power interface bus 1570 can include a ground, a 3 volt power source, an alarm, a fault, an AF (alarm or fault) decode, a B0 pin, an B1 pin, and a sounder.

Figure 16:
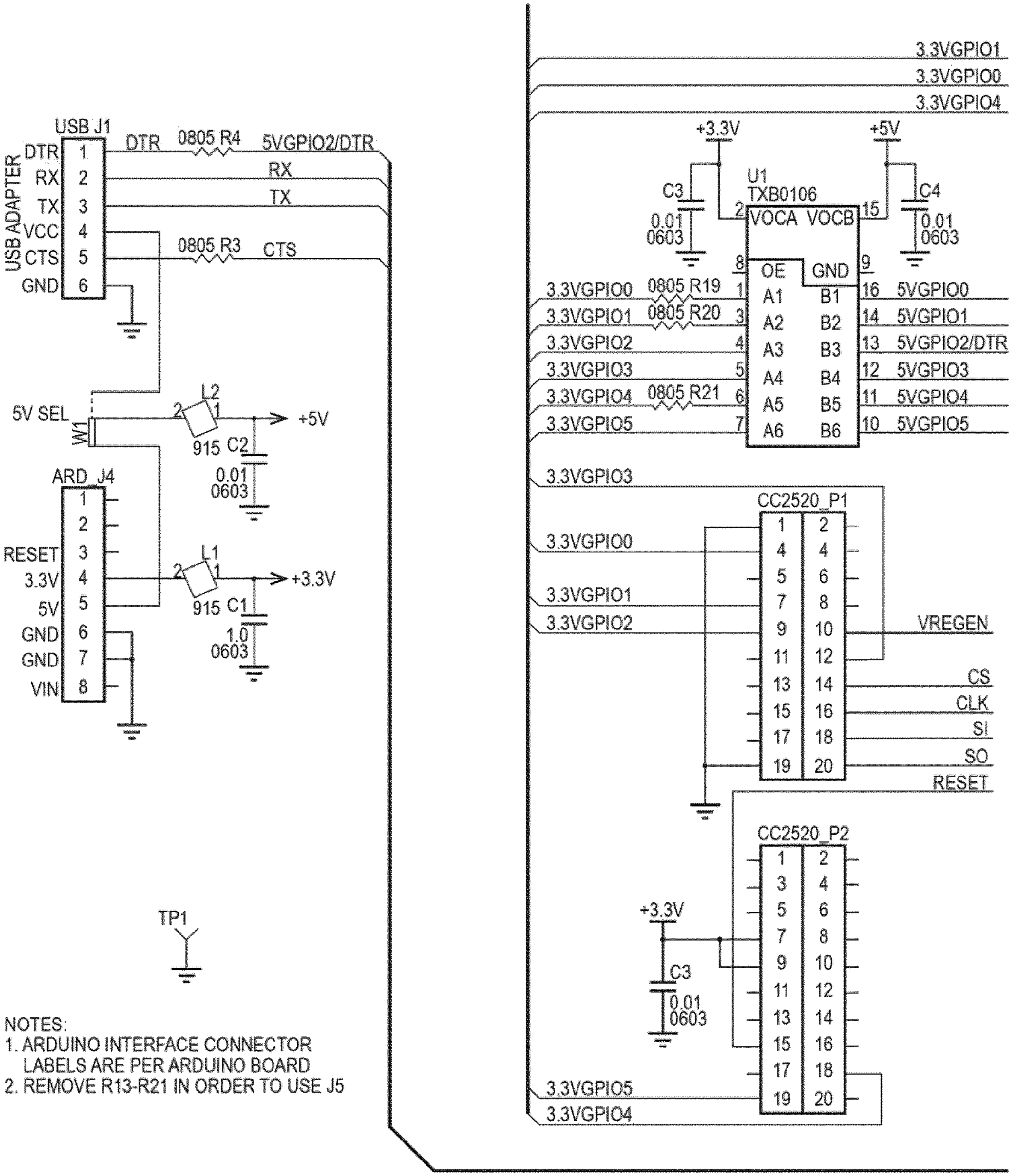
FIG. 16 is a schematic diagram illustrating a possible embodiment of a shield design in accordance with an illustrative embodiment.
Figure 16:
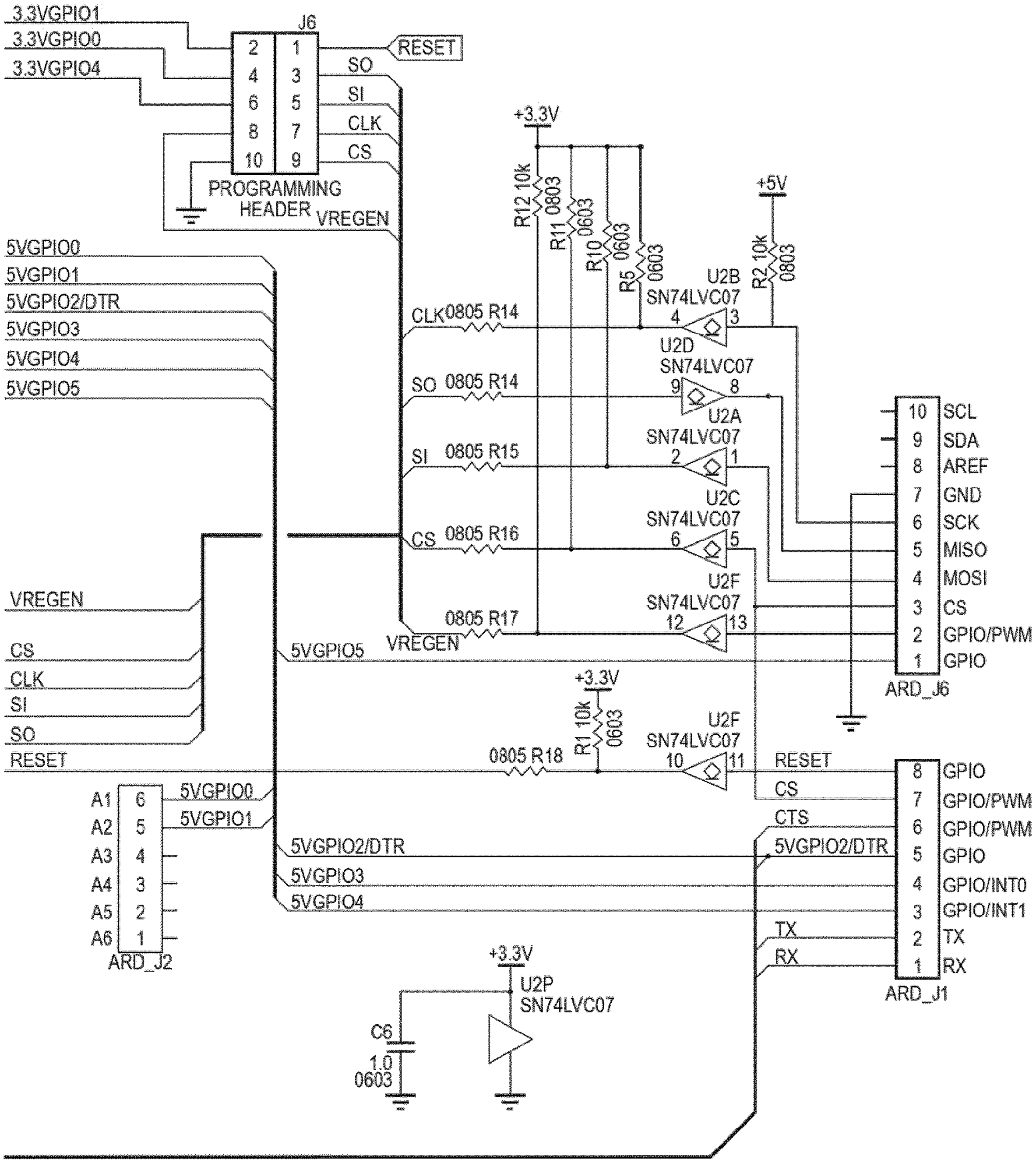

In another illustrative embodiment, a shield design may be used in conjunction with an antenna for the system. For example, an LSR shield may be used such as the MSP430 802.15.4 shield with a high gain front end with an Arduino shield interface. In another embodiment, a shield design as shown in FIG. 16 may be used. An illustrative shield design may be able to work through an Arduino platform or an Atmel platform, for example. Such a shield design may also provide network connectivity to anything compatible with an Arduino shield footprint.

Figure 17:
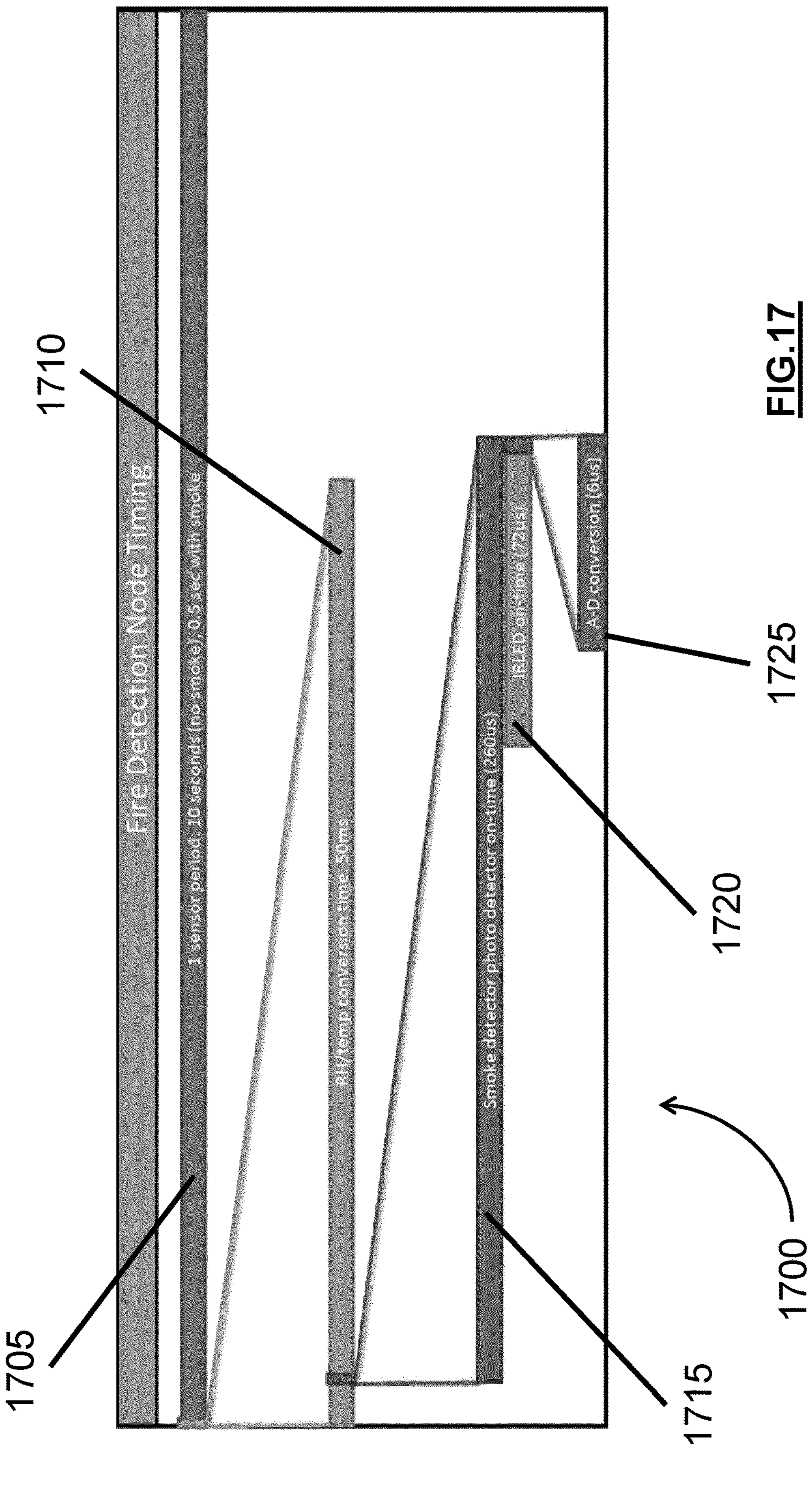
FIG. 17 is a graph diagram illustrating timing of sensor and microcontroller signals in a smoke detector in accordance with an illustrative embodiment.

FIG. 17 shows a graphical demonstration of the timing of the sensors and microcontrollers within a smoke detector as discussed above with respect to Table 1 and FIGS. 5-12 and 15. The timing scenario in FIG. 17 shows a possible timing scenario that may be useful for reducing power consumption in a smoke detector. Other time periods could be used than those shown, as FIG. 17 merely shows one possible configuration. FIG. 17 demonstrates the timing of certain sensors and signals in relation to one another, it does necessarily depict how a microcontroller or other component would control and read each sensor or driver.

In graph 1700, sensor period 1705 represents the cycle of one sensing period. When the system has not sensed any alarm condition, like the presence of smoke, the period may be 10 seconds long. If the system has sensed an alarm condition, like the presence of smoke, the period may be shorter, for example 0.5 seconds. The longer period during a non-alarm condition reduces power consumption by sensors and other components in the smoke detector. Relative humidity (RH)/temperature conversion time period 1710 is shown as a subset of sensor period 1705, and expanded so as to show other subsets of the RH/temperature conversion time period 1710.

The RH/temperature conversion time period 1710 demonstrates the amount of time it could take to read the temperature and relative humidity of the surrounding environment. This time may be 50 milliseconds (ms). The RH/temperature conversion time period 1710 (as well as the other sensor times shown as a subset of the sensor period 1705) may be the same regardless of whether the sensor period 1705 has sensed an alarm condition or not. In other words, regardless of whether the sensor period 1705 is 10 seconds or 0.5 seconds the other sensing times would remain the same. In other embodiments, the other sensor and conversion times may vary based on whether there is an alarm condition or not.

A smoke detector photo detector on-time 1715 is shown as a subset of RH/temperature conversion time 1710. The smoke detector photo detector on-time 1715 may be 260 microseconds. Toward the end of the smoke detector photo detector on-time, the IRLED on-time 1720 may be activated. This may occur during the last 72 microseconds of the smoke detector photo detector on-time 1715. Concurrent with the last 6 microseconds of the smoke detector photo detector on-time 1715 and the IRLED on-time 1720, the analog to digital (A-D) conversion 1725 may be performed to produce a digital signal for the photo detector that is powered on, as represented by the smoke detector photo detector on-time 1715. Although the timing of these operations may vary, it demonstrates that the operations are a small proportion of the sensor period 1705, thereby reducing power consumption of the sensors and system components.

Figure 18:
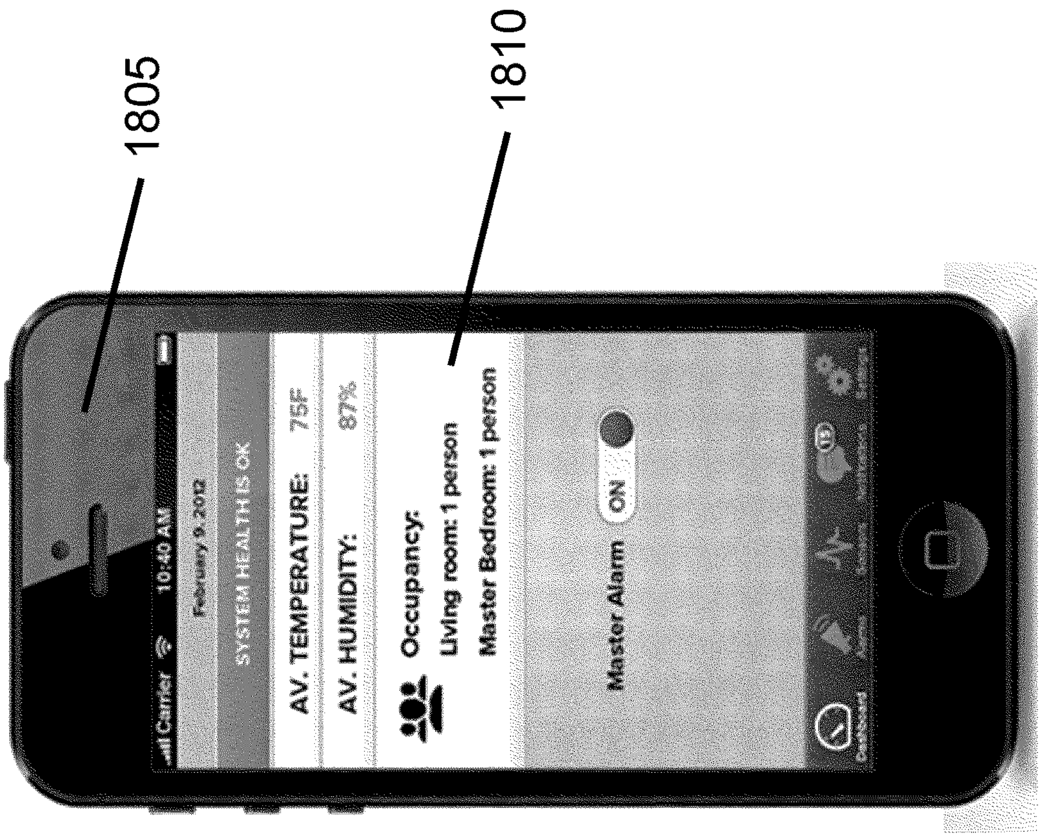
FIG. 18 is a figure illustrating an interface on a smartphone device in accordance with an illustrative embodiment.

Disclosed herein is also a user interface which can be used with the disclosed systems. The user interface can indicate conditions of the system, indicate alerts from the system, and communicate with the system. The communication with the system may effect changes or settings within the system. In FIG. 18, an example user interface is shown displayed on a smart phone 1805. The interface is visible on the touch screen 1810. Through the touch screen 1810, the user can view and interact with displays relating to the system. This can also allow the user to communicate with the system itself. Although FIG. 18 shows a smart phone, other computing devices may also be used to display the user interface such as a laptop, blackberry, desktop computer, computing enabled televisions and gaming systems, tablets, digital media players, computing enabled watches, or computing hardware designed specifically to provide an interface for an enhanced emergency detection system.

Figure 19:
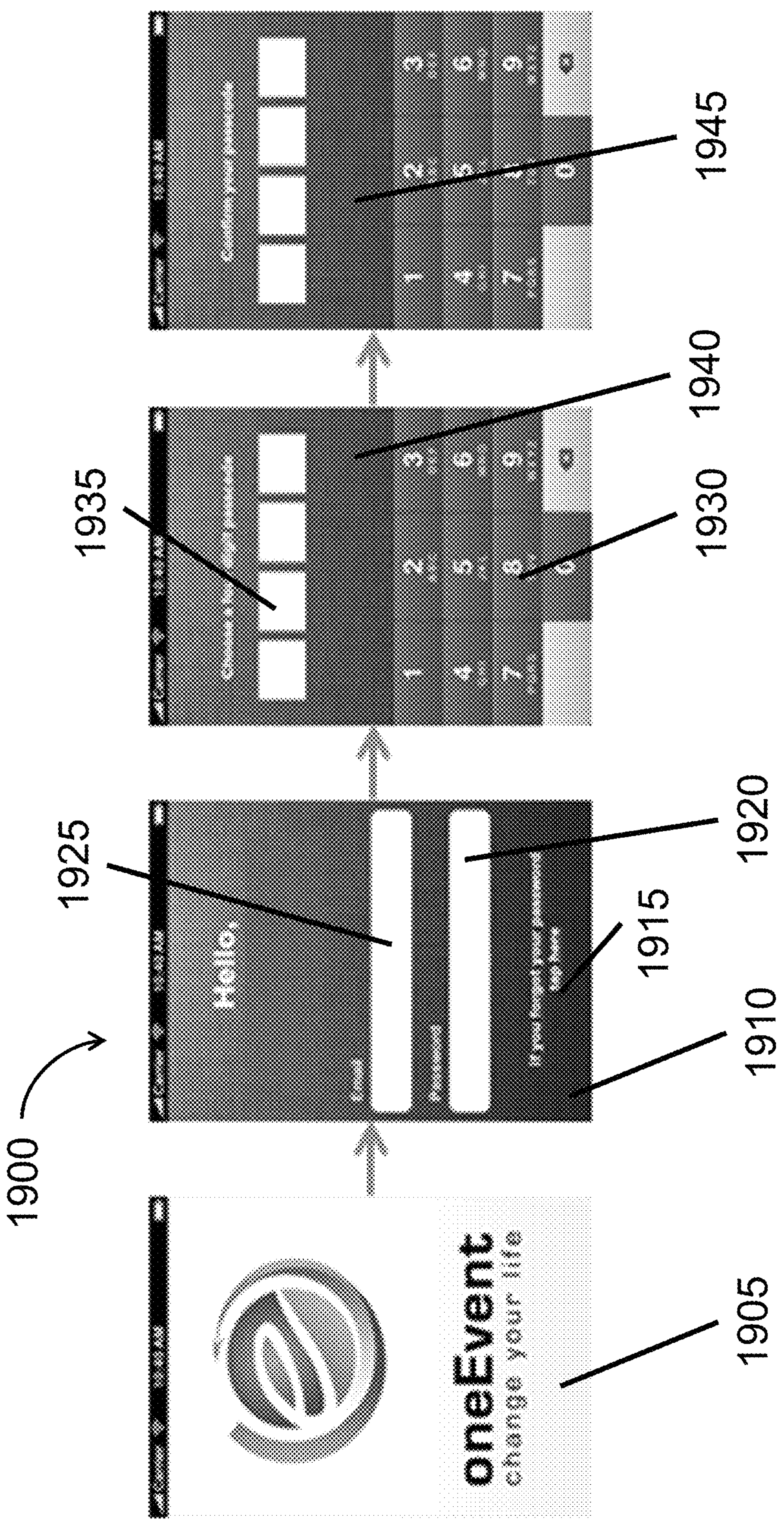
FIG. 19 is a figure illustrating an interface for an initial login screen procedure in accordance with an illustrative embodiment.

FIGS. 19-27 further demonstrate a possible embodiment of a user interface for an enhanced emergency detection system. FIG. 19 shows an initial login screen procedure 1900. A first screen 1905 is displayed to indicate the application that is running. An initial login screen 1910 is then displayed. A transition from the first screen 1905 to the initial login screen 1910 may occur once the application is completely loaded, or it may happen upon some input of a user, such as a tap on a touch screen or finger swipe on the touch screen. Alternatively, the application may switch the first screen 1905 to the initial login screen 1910 automatically after a set amount of time.

On the initial login screen 1910, a user may input their e-mail address into text entry box 1925 and may input their password into text entry box 1920. In this embodiment, a user has already set up an account with the vendor of the application before downloading it, so upon entering an e-mail and password, even for the first time, the application can call a database and confirm that the e-mail and password match an existing account already set up with the vendor. In other embodiments, the user may not have already set up an account with the vendor, and the user interface may provide additional screens and inputs for setting up an account with the vendor. If a user has forgotten their already established password, they may tap on a forgot password button 1915. Upon tapping the forgot password button 1915, the interface may display other confirmation or identification entry screens that are not pictured in FIG. 19. These screens may assist a user that has forgotten their password and give them reminders, ask them security questions, or e-mail them their password.

Upon entering a valid e-mail and password into text entry boxes 1925 and 1920, respectively, the user interface can display an establish passcode screen 1940. On the establish passcode entry screen 1940, a user is prompted to use a number pad 1930 to set a four digit passcode in passcode display boxes 1935. Upon entering a four digit passcode, the user interface can ask a user to re-enter the four digit passcode on a passcode confirmation screen 1945.

After a user has completed the steps in the initial login screen procedure 1900, the user does not need to go through the steps in subsequent logins. Rather, they may only have to go through the normal login procedure 2000 shown in FIG. 20. This can offer a user quick, secure, and easy access to data through the use of the user interface. In the normal login procedure 2000, only a passcode entry screen 2005 is shown. Thus, the user only needs to enter their four digit passcode to access the user interface as opposed to their e-mail, password, and four digit passcode. After entering the four digit passcode on the passcode entry screen 2005, the user interface can display a dashboard screen 2010. The home screen can display a navigation bar 2015. The navigation bar 2015 can include buttons for the dashboard screen 2010, notification screens, list/sensor floor plan screens, warning and alarm screens, and a configuration and settings screen. The navigation bar 2015 can also be updated when a condition changes. For example, if there is a new notification, a notification icon on the navigation bar 2015 may display a number near the icon to reflect the presence and number of new notifications. Similarly, the other icons present on the navigation screen can display similar information. For example, a configuration and settings icon may be changed to reflect when a software update is available. The dashboard icon may be changed when an alarm condition has occurred. Another way the notification icons could be changed to notify a user of a changed condition is to change the color or appearance of the icon. The other possible screens are demonstrated in FIGS. 22-27. A user may be able to select a button from the navigation bar 2015 and be sent to the screen indicated by the button. The navigation bar 2015 also indicates to the user which screen the user is currently viewing by highlighting the button that corresponds with the screen that is currently being displayed.

Figure 20:
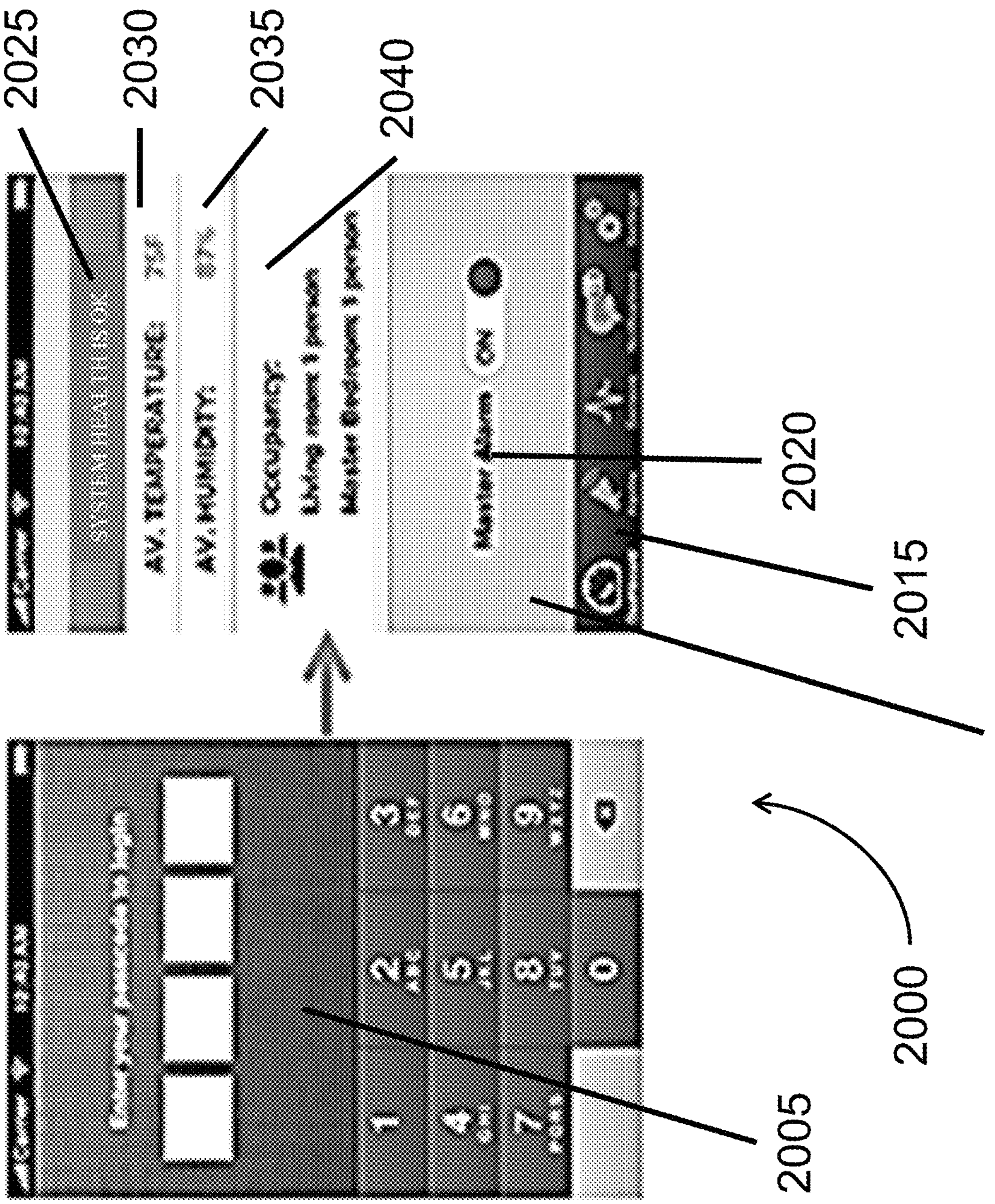
FIG. 20 is a figure illustrating an interface for a normal login procedure in accordance with an illustrative embodiment.

Also displayed on the dashboard screen 2010 is a status indicator 2025. In FIG. 20, the status indicator shows that system health is ok. Other indicators can be displayed indicating the current status of the system. An average temperature display 2030 is also present on the dashboard screen 2010. This can be updated to reflect a real time average of the temperature at all the nodes, sensors, and detectors of a system. It could also reflect the average of a subset of all the nodes, sensors, and detectors of a system. Similarly, average humidity display 2035 is shown on the dashboard screen 2010 and may display an average humidity of all or some of the components in a system. Occupancy display 2040 is also shown on the dashboard screen 2010. This can indicate whether an occupancy sensor in the system is aware of the presence of someone or something in a structure or elsewhere. In this embodiment, occupancy display 2040 shows a person to be present in the living room of a house and another person to be present in the master bedroom of a house. Further, the dashboard screen 2010 displays a master alarm indicator/button 2020. This can indicate whether the enhanced emergency detection system is ready and sensing for alarm conditions. Additionally, it is also a button that can turn off or on the overall system. When the button is pushed to turn the master alarm off, the master alarm indicator/button 2020 can indicate that it is off, and vice versa.

Figure 21:
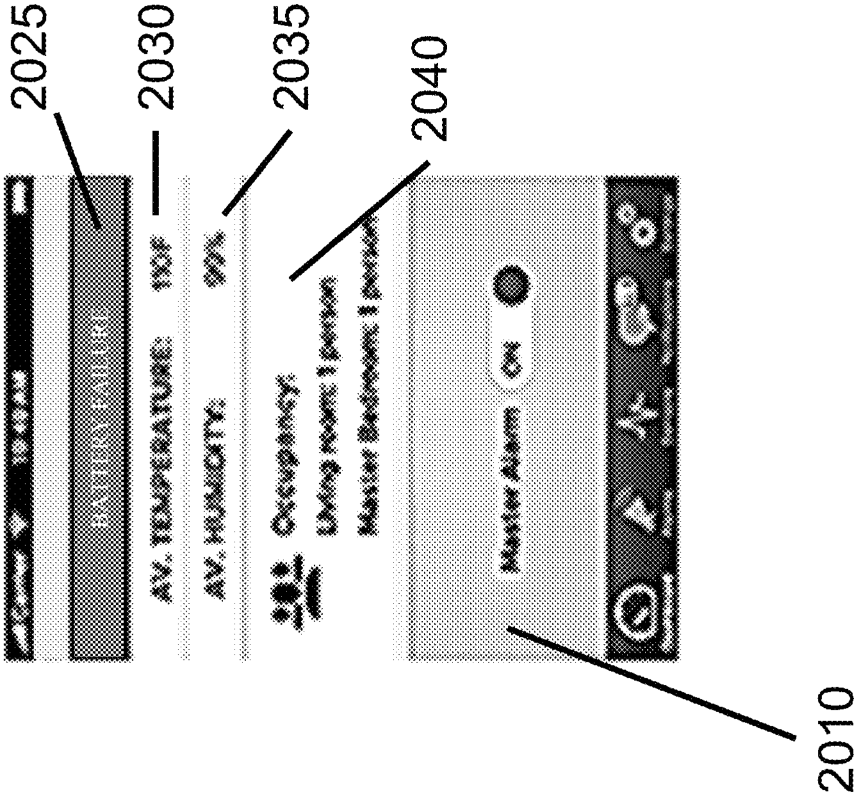
FIG. 21 is a figure illustrating an interface for a dashboard screen during an alarm condition in accordance with an illustrative embodiment.

In FIG. 21, the dashboard screen 2010 is shown, but when an alarm condition is present. In this embodiment status indicator 2025 indicates that there is a battery failure in the system. The average temperature display 2030 shows that an average temperature is 110 degrees Fahrenheit. Average humidity display 2035 shows that the average humidity is 99%. Occupancy display 2040 continues to show the occupancy information of the structure. In the embodiment shown in FIG. 21, certain parts of the display may be displayed as different colors if the information is related to the alarm condition. For example, since the temperature is high, average temperature display 2030 may be red instead of a normal green color. Other colors may be used in other embodiments. Other parts of the display may also have different color schemes as well.

Figure 22:
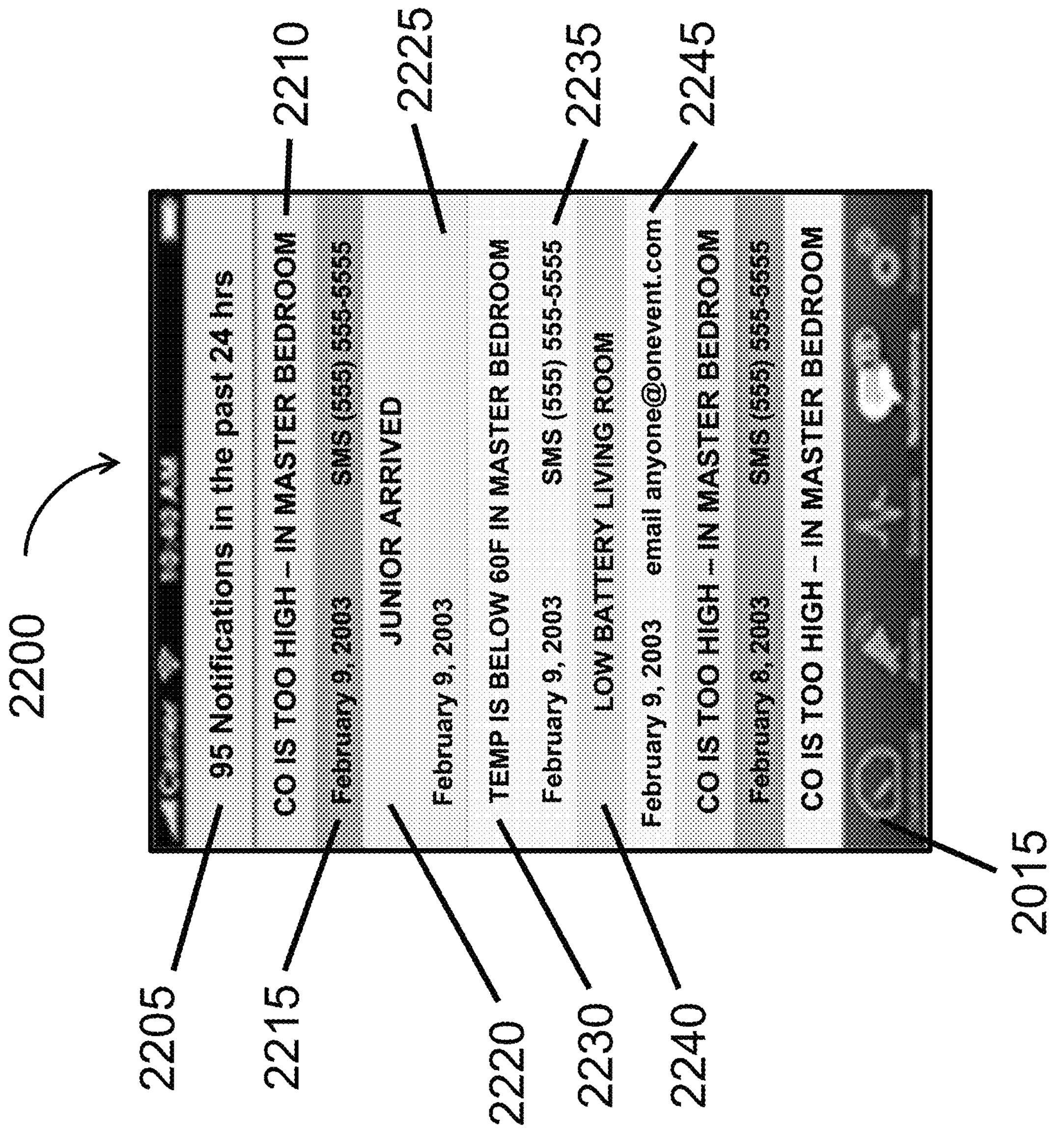
FIG. 22 is a figure illustrating an interface for a notification screen in accordance with an illustrative embodiment.

When a notification button on the dashboard bar 2015 is selected, the user interface displays a notification screen 2200 as shown in FIG. 22. The dashboard bar 2015 is also still displayed, but it now highlights a notifications icon indicating that the notification screen 2200 has been selected. Notification screen displays a notification summary 2205. This displays the number of notifications that have occurred over the past 24 hours. The notification summary 2205 may also display whether there are any new notifications that the user has seen previously. Additionally, the notification summary may be customized to show notifications that have occurred during a different time period than 24 hours. Under the notification summary 2205, the notification screen 2200 displays several notifications. These notifications may be static or may be selected to provide details of the notification on another screen not shown here. Upon selecting a notification, a user may also be able to change the settings of how a notification is displayed or how the system delivers a notification to a user. The user may also be able to scroll through the notifications, allowing the user access to more notifications than are displayed originally on the notification screen.

Notification 2210 indicates that carbon monoxide (CO) levels were higher than normal in a master bedroom of a residence. Notification 2210 also includes a data bar 2215 that includes further information about the notification. Data bar 2215 indicates a date that the notification occurred, and an action regarding that notification. In data bar 2215, the action taken was a short message service (SMS) message sent to a particular telephone number. Other options are possible in the data bar. For example, it may also display the time of day at which the notification occurred. Additionally, as mentioned above, other information or settings related to a notification can be accessed or adjusted by selecting a given notification.

Notification 2220 indicates to a user that a person has arrived at the structure or location being monitored. Data bar 2225 indicates the date of this arrival, but does not indicate an action taken. Some notifications, like this one, may not have an associated action. Notification 2230 indicates that the temperature is lower than normal in the master bedroom of a residence. Data bar 2235, similar to data bar 2225, indicates the date and that an SMS message has been sent regarding the notification condition.

Notifications can also be related to conditions of the system. Notification 2240 indicates that a battery in a sensor in the living room is low. Data bar 2245 of notification 2240 indicates the date of this notification and that an action was taken. In this case, the action taken was an e-mail sent to a particular e-mail address. In other embodiments, other actions could occur. These actions could include placing a call to a particular phone number or voice over internet protocol (VoIP) number, alerting emergency personnel of an alarm condition, or making adjustments to the enhanced emergency detection system or other systems in a structure being monitored. For example if notification 2230 occurs, the system may automatically send a message to a heating, ventilation, and air conditioning (HVAC) system. Alternatively, the user interface may allow a user to choose whether to send such a message based on the notification.

In another embodiment, the notification screen 2200 may be customizable. For example, the notification list shown may be customized by showing notifications that fall within a certain date and time range. The notification list may also be customized to show notifications relating to a specific node or nodes in an enhanced emergency detection system. A specific set of nodes may be specified by a user who wants to sort notifications for only a particular room, floor, or wing of a structure. A user may also be able to customize groups of nodes for display as well. In another embodiment, lists may be available on another display screen as noted below.

Figure 23:
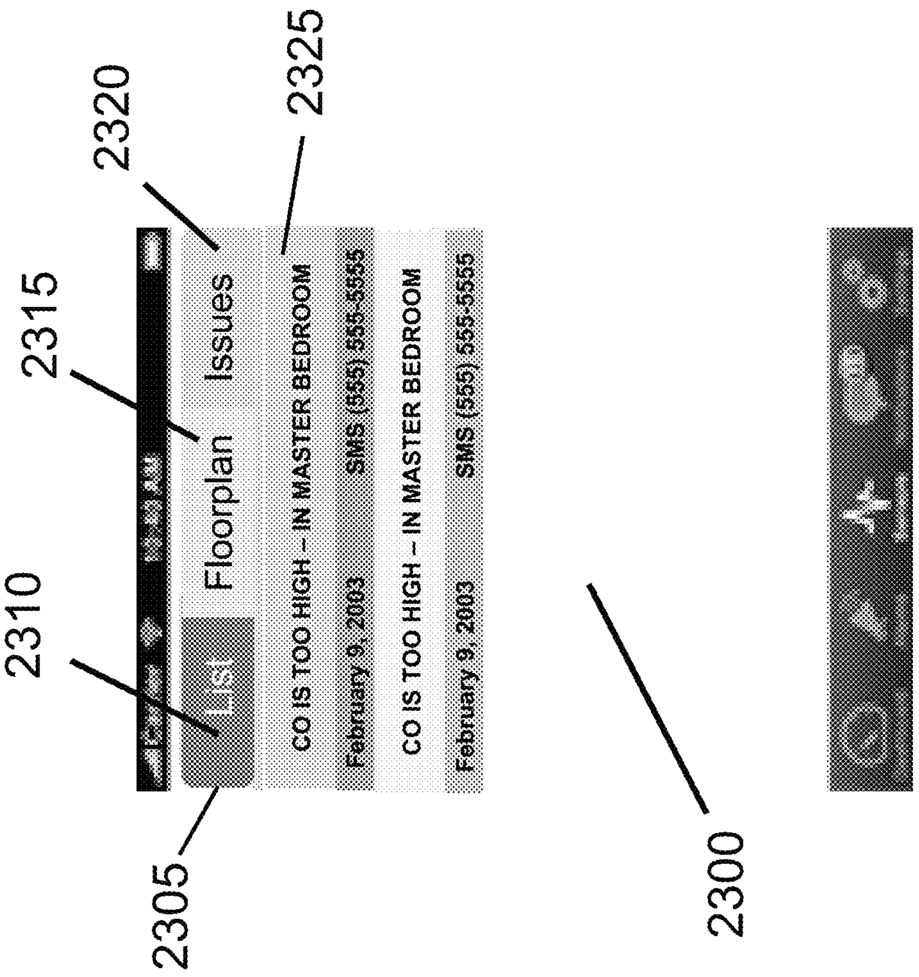
FIG. 23 is a figure illustrating an interface for a list screen in accordance with an illustrative embodiment.

When a list/sensor floor plan button on the dashboard bar 2015 is selected, the user interface displays a list screen 2300 as shown in FIG. 23. List screen 2300 has a navigation pane 2305 displayed. This navigation pane 2305 allows a user to select from different display options. A list button 2310 allows a user to display a list of issues related to a floor plan or room. A floor plan button 2315 allows a user to see a visual representation of a floor plan and node statuses. An issues button 2320 allows a user to see a list of issues with the enhanced emergency detection system. If the list button 2310 is selected, as in FIG. 23, list screen 2300 is displayed. This displays certain notifications 2325 related to a particular room or floor plan. Alternatively, a user may navigate to the list screen 2300 from the notification screen 2220 instead of using the dashboard bar 2015.

Figure 24:
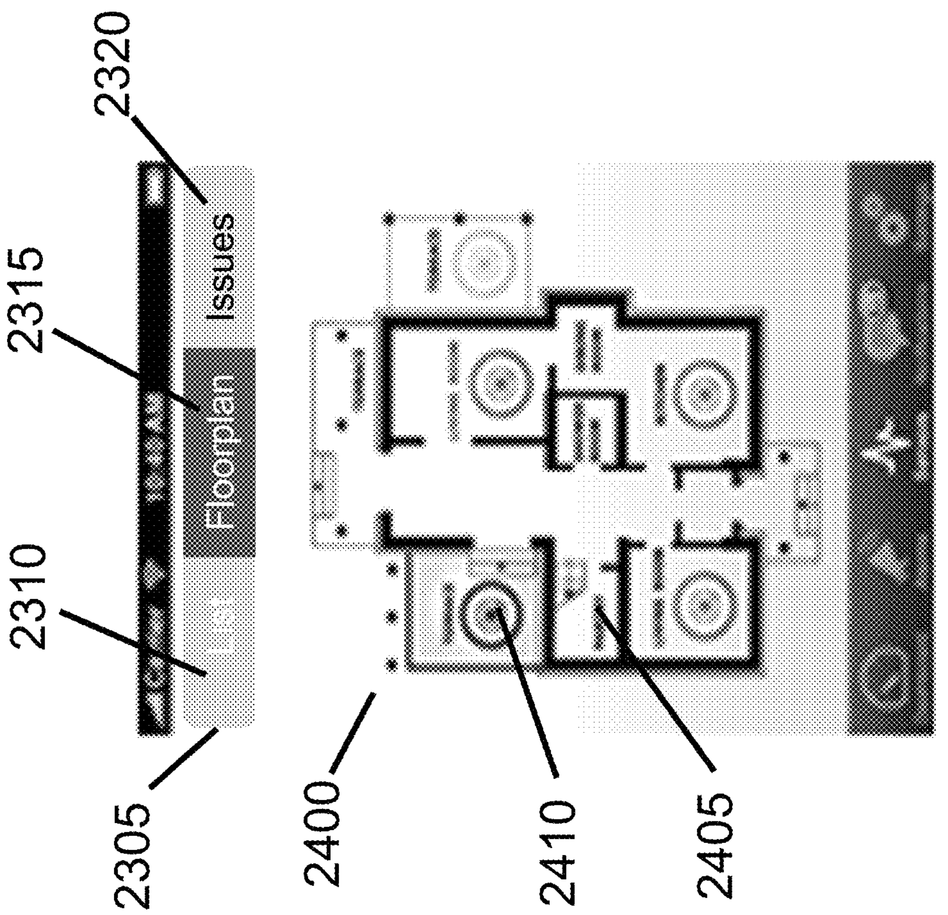
FIG. 24 is a figure illustrating an interface for a floor plan screen in accordance with an illustrative embodiment.

When the floor plan button 2315 is selected, a floor plan screen 2400 is displayed, as shown in FIG. 24. The floor plan screen 2400 shows a visual representation of a floor plan 2405 of an actual structure. It also shows the location of nodes or sensors in different rooms. For example, sensor 2410 is depicted visually upon the floor plan 2405. The floor plan 2405 depicts different rooms, halls, stairways, and doorways of a structure. The floor plan 2405 can also depict outdoor areas of a structure, such as a yard, terrace, patio, balcony, or roof. Sensor 2410 can also be depicted as different colors to indicate a status of the sensor. For example, the sensor 2410 may be depicted as a green sensor when everything is ok. The sensor 2410 may also be depicted as a yellow sensor when there is a system problem, such as the battery being low. In another example, the sensor 2410 may be depicted as red when there is an alarm condition, such as smoke or high temperatures.

Figure 25:
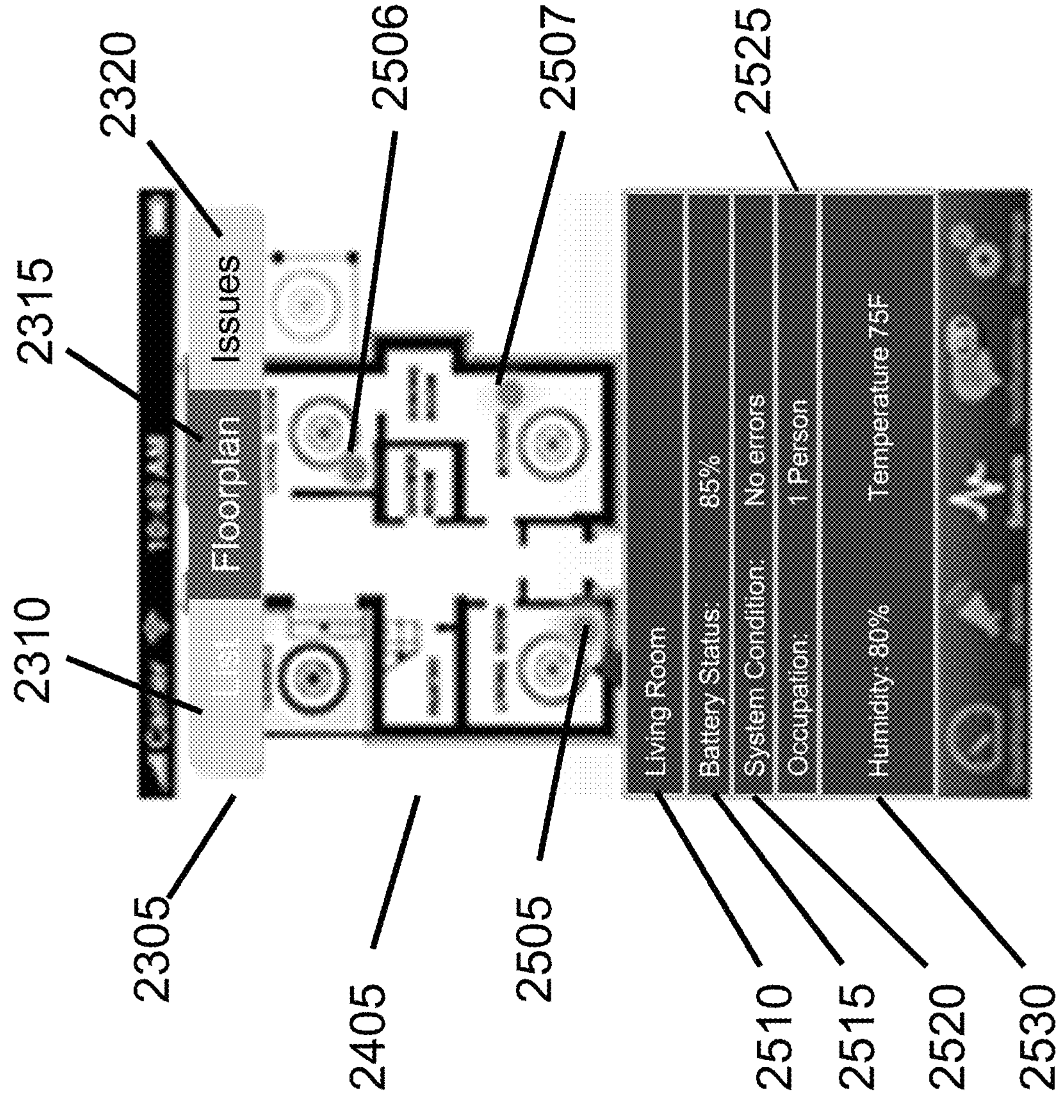
FIG. 25 is a figure illustrating an interface for a floor plan screen with a room selected in accordance with an illustrative embodiment.

In an illustrative embodiment, a particular node or room can be selected by the user. FIG. 25 depicts a user interface where a living room of a structure has been selected on the floor plan 2405. The floor plan 2405 may also display occupants 2505, 2506, and 2507. These occupants 2505, 2506, and 2507 may represent actual persons within the structure. Additionally, upon selection of a room by a user, room and sensor details may be displayed on the user interface. Room identifier 2510 displays the name of the selected room, in this case a living room. A battery status indicator 2515 is also displayed. The battery status indicator 2515 shows the percent of battery life remaining. The interface can also display a system condition indicator 2520, and in this case it displays no errors with the sensors in the selected room. Occupant information 2525 may also be displayed. In this case, there is one person present in the selected living room, also indicated by occupant 2505. The interface can also display environment condition data 2530 collected from sensors in the selected room. In this case, environment condition data 2530 displays the humidity and the temperature sensed in the living room.

Figure 26:
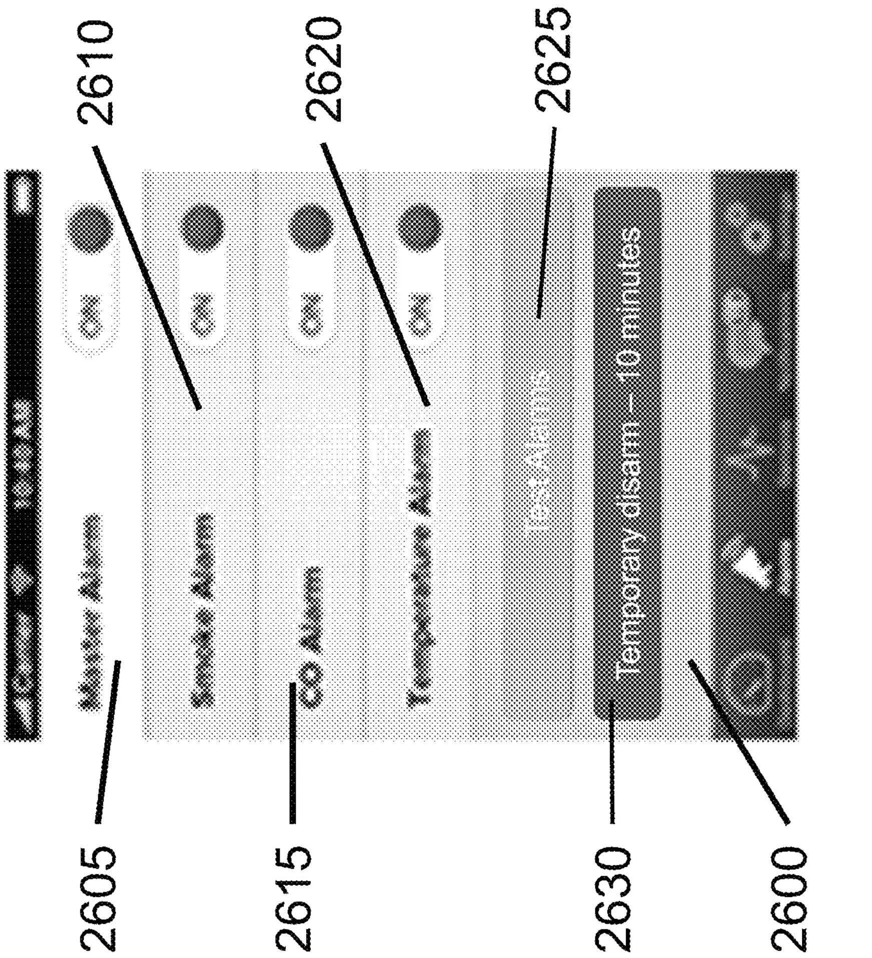
FIG. 26 is a figure illustrating an interface for a warning and alarms screen in accordance with an illustrative embodiment.

When a warnings and alarms button on the dashboard bar 2015 is selected, the user interface displays a warning and alarms screen 2600 as shown in FIG. 26. The warning and alarms screen 2600 displays a master alarm indicator/button 2605. This shows the status of a master alarm and whether it is on or off. The status can be changed by toggling the master alarm indicator/button 2605. A smoke alarm indicator/button 2610 is also displayed with similar features to the master alarm indicator/button 2605. Other alarm indicator/buttons can be displayed in the same manner and with the same functionality, such as a CO alarm indicator/button 2615 and a temperature alarm indicator/button 2620.

When a user selects a particular alarm, options relating to that alarm may be displayed on the user interface. For example, in the embodiment shown in FIG. 26, the master alarm indicator/button 2605 is selected. Accordingly, a test alarm button 2625 and a disarm button 2630 is displayed. Test alarm button 2625 allows a user to test the selected alarm. This may be worthwhile to ensure alarm systems are working properly. Disarm button 2630 may temporarily disarm the selected alarm. It may disarm the alarm for a specified amount of time, disarm it indefinitely until reactivated by the user, or some combination of the two.

Figure 27:
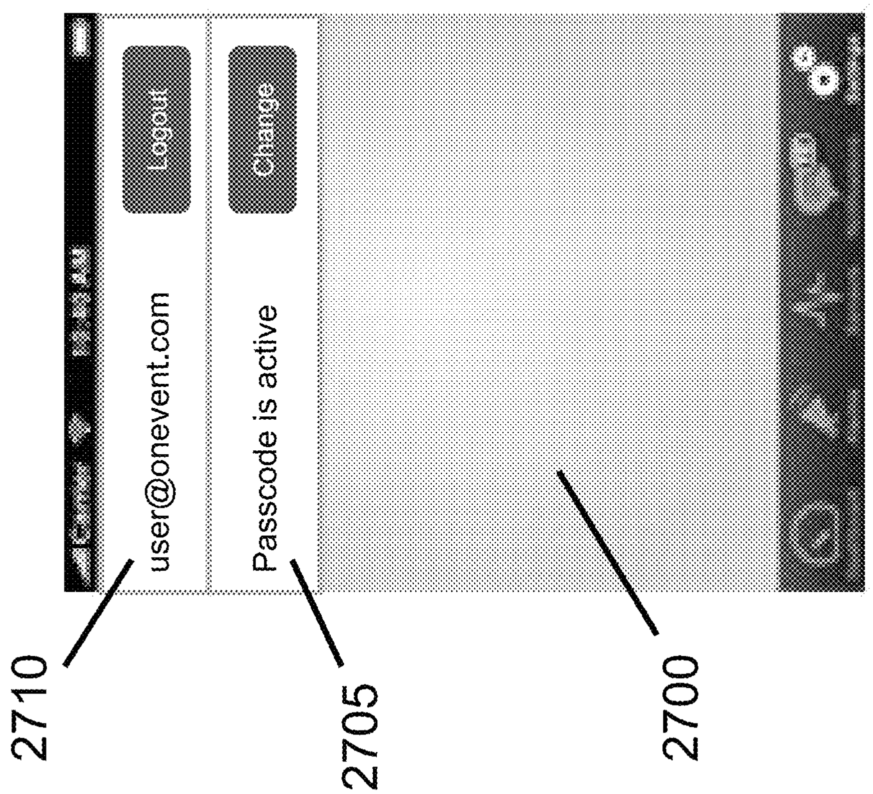
FIG. 27 is a figure illustrating an interface for a configuration and settings screen in accordance with an illustrative embodiment.

When a configuration and settings button on the dashboard bar 2015 is selected, the user interface displays a configuration and settings screen 2700 as shown in FIG. 27. The configuration and settings screen 2700 displays various settings or indicators relating to the account and interface software. For example, in this embodiment, an account information 2710 and passcode information 2705 is displayed. The account information 2710 displays the username or e-mail of the user that has activated the interface. It also provides an opportunity to log that user out of the interface. If logged out, a user may need to repeat the initial log in steps of FIG. 19 to reactivate the user interface. The passcode information 2705 displays whether the user identified in account information 2710 has an active passcode. If a passcode is not active, a user may not be able to access certain features of the interface. Additionally, a user may not be able to make changes to the enhanced emergency detection system through the user interface if a passcode is not active. The passcode information 2705 also includes a change button which allows a user to change their passcode when needed.

Figure 28:
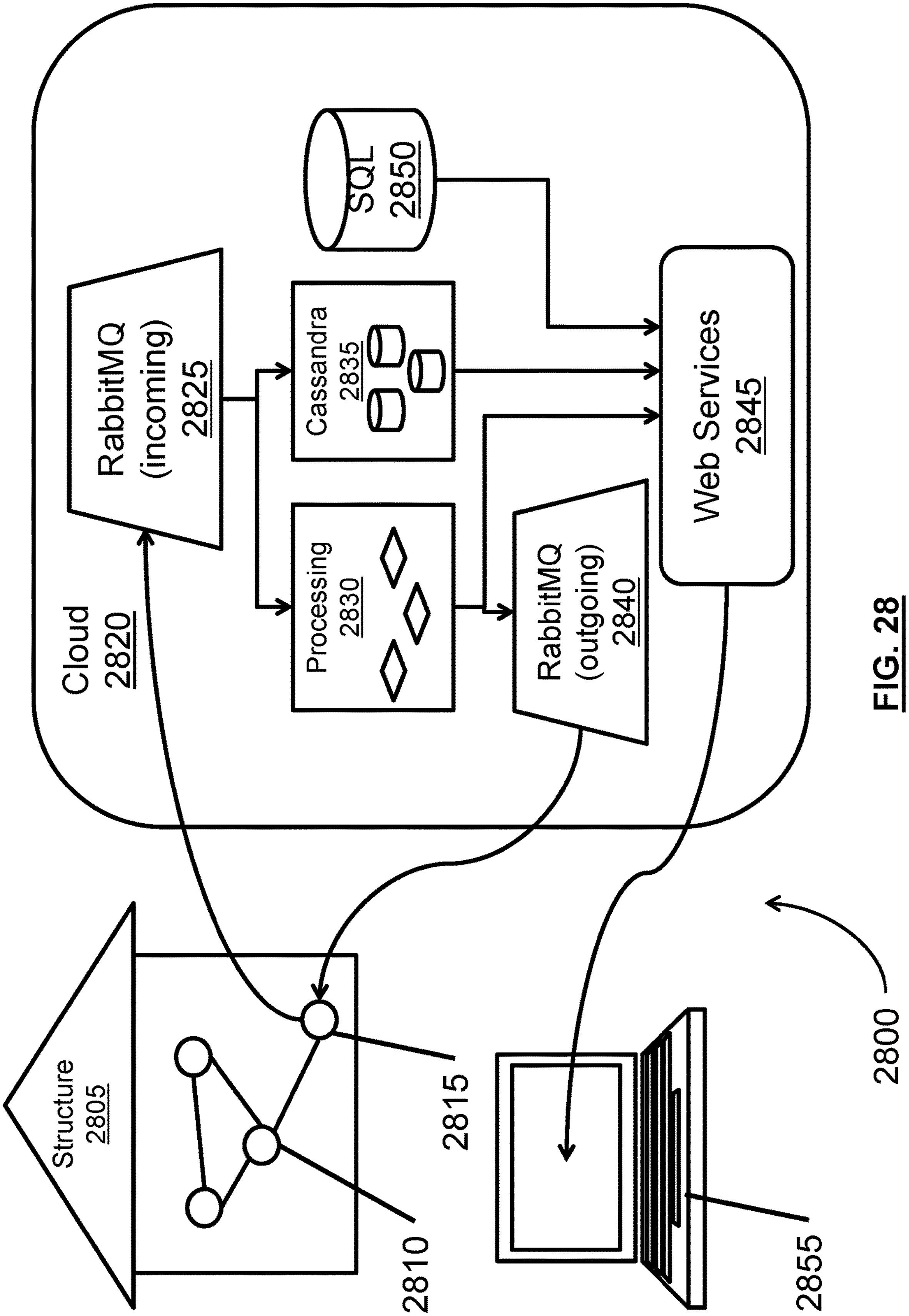
FIG. 28 is a block diagram illustrating an enhanced emergency detection system with a cloud computing component in accordance with an illustrative embodiment.

In an illustrative embodiment, an enhanced emergency detection system may also be used in a cloud computing system 2800. An embodiment of that is demonstrated by FIG. 28. A structure 2805 has nodes 2810 and 2815. This configuration is in accordance with embodiments of enhanced emergency detection systems described herein. A node 2815 communicates with the cloud computing system 2820. This can be done using RabbitMQ (Rabbit message queuing) protocol, which is an implementation of advanced message queuing protocols (AMQP). The use of RabbitMQ allows for bidirectional messaging. Messages can also be filtered into separate work queues with different priority and redundancy using the structures disclosed herein. This type of system may also easily accommodate various sensor types. A communication from the node 2815 is sent to the incoming RabbitMQ 2825, where it can then be sent to processing 2830 and Cassandra storage 2835. Cassandra type storage is one type of storage that may be used. The Cassandra storage 2835 allows the storage of sensor data from the various nodes in the structure 2805. The Cassandra storage 2835 also allows for linear scalability and location and Rack-aware redundancy. The processing 2830 can determine if, based on the signal communication sent from the node 2815, a communication to be sent back to the node 2815 through an outgoing RabbitMQ 2840. Additionally, an SQL (structured query language) database 2850 can be used to store user demographics and settings. The processing 2830, Cassandra storage 2835, and SQL database 2850 can each provide information to web services 2845. Web services 2845 can provide an interface for users, administrators, or other individuals through a computing device 2855.

Figure 29:
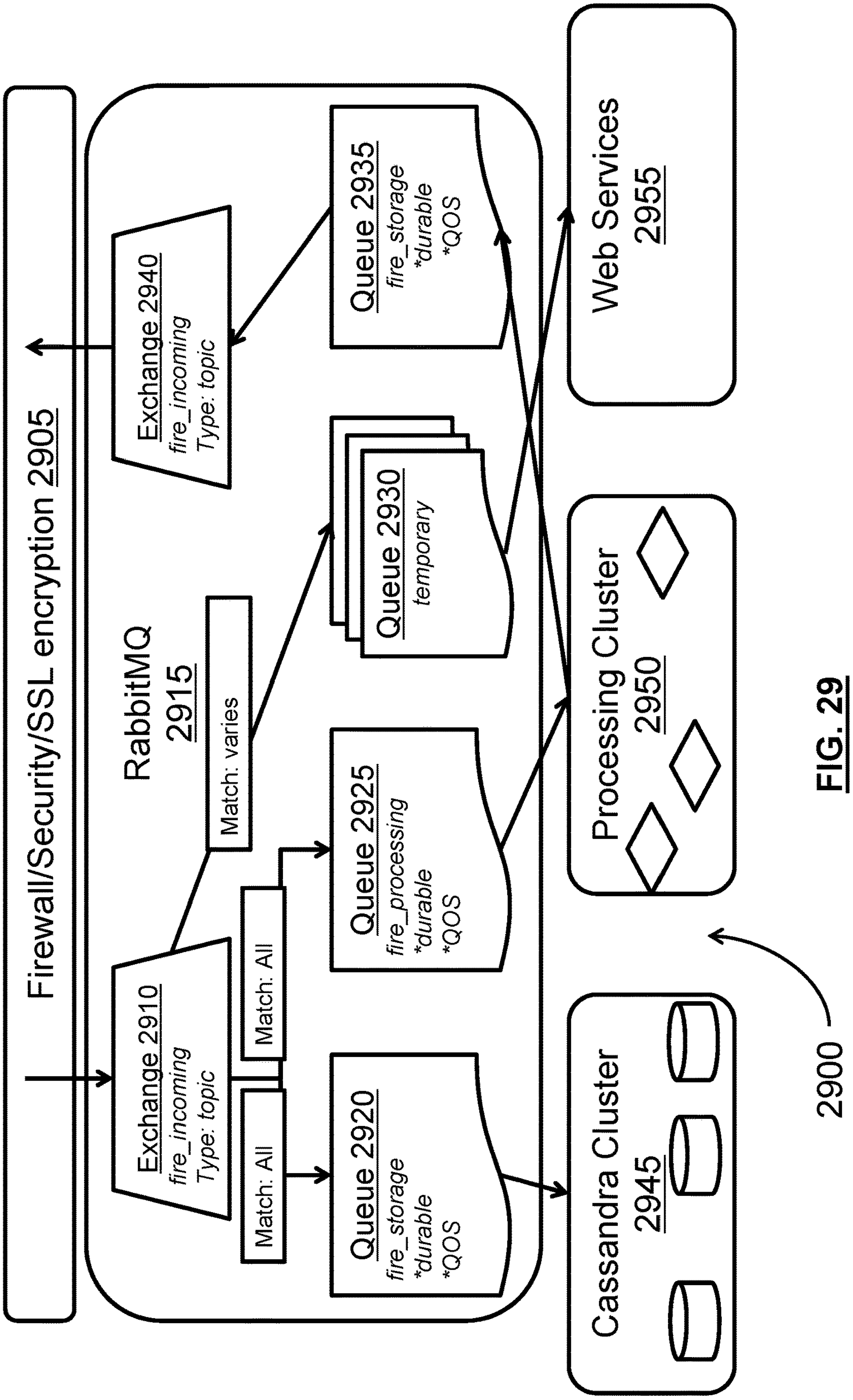
FIG. 29 is a block diagram illustrating a cloud computing component of an enhanced emergency detection system in accordance with an illustrative embodiment.

FIG. 29 shows another embodiment of an implementation of an enhanced emergency detection system by using a cloud computing system 2900. Data is sent from nodes in the system to a firewall/security/SSL encryption 2905. The Data then is sent to the RabbitMQ 2915. Specifically, the data first goes through an Exchange 2910. The data then goes from the exchange 2910 to other various locations. The data can go to some or all of the following locations depending on how the RabbitMQ 2915 and exchange 2910 characterizes it. The data can be sent to queue 2920 which then sends the data to a Cassandra storage cluster 2945. Another location the data may be sent is to queue 2925, which sends the data to a processing cluster 2950. The processing cluster may then determine that a communication needs to be sent back to the nodes in the enhanced emergency detection system. If so, the processing cluster 2950 sends a communication back to the RabbitMQ 2915 through queue 2935. The message is then sent to an exchange 2940 and back through the firewall/security/SSL encryption 2905 and to the nodes. Another location the data may be sent from the exchange 2910 is to queue 2930. This queue can provide information to web services 2955. Web services 2955 can provide an interface for users, administrators, or other individuals through a computing device.

In another illustrative embodiment, an enhanced emergency detection system may also function as a security system. Since it is capable of tracking occupants and alerting users, among other things, it would be useful for security purposes.

Figure 30:
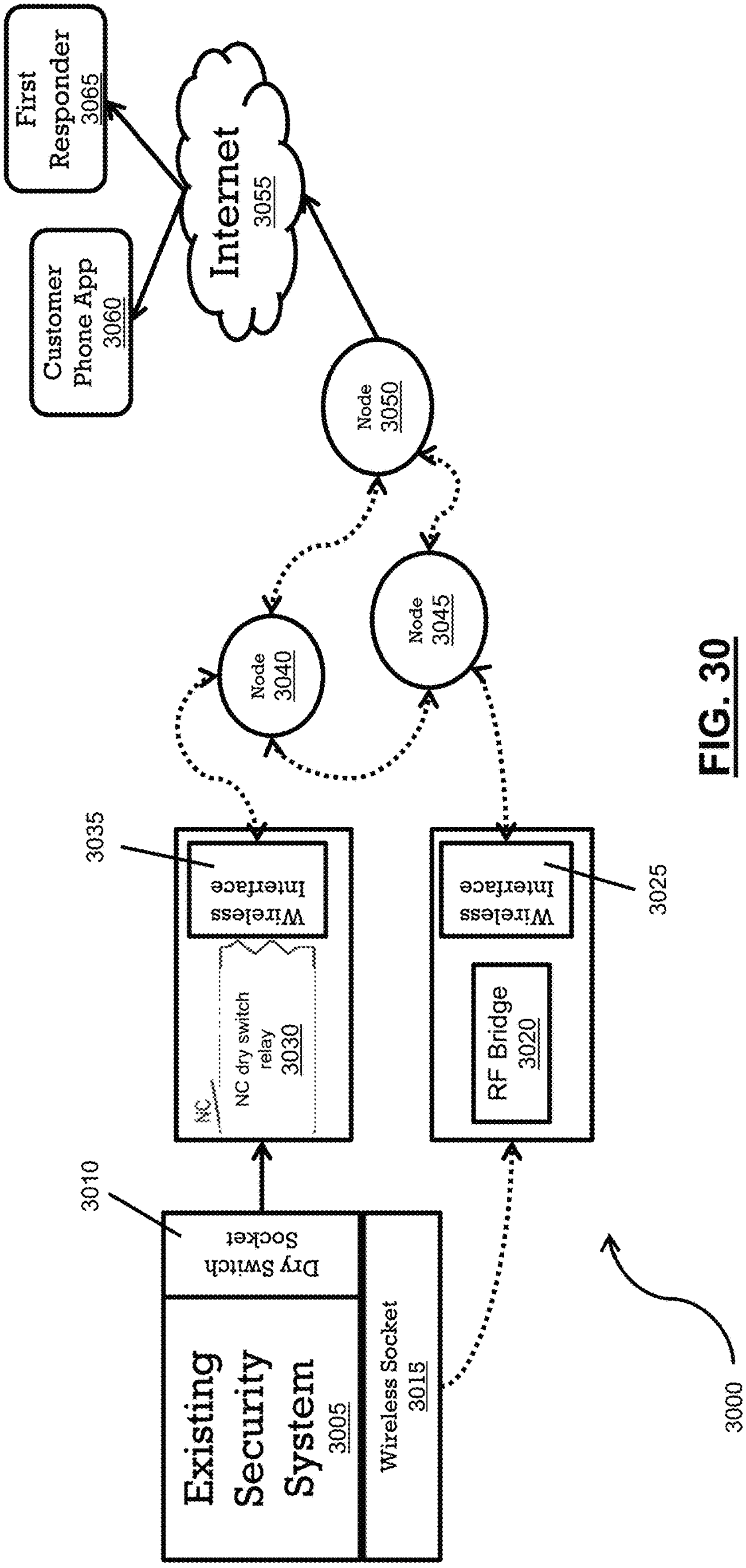
FIG. 30 is a block diagram illustrating an enhanced emergency detection system integrated with an existing security system in accordance with an illustrative embodiment.

Additionally, an enhanced emergency detection may be integrated into an existing security system. Some security systems may already have some sensors installed as well that can be utilized by the enhanced emergency detection system. For example, a security system may already have smoke detectors installed in a structure. In that case implemented an enhanced emergency detection system may only require adding nodes capable of communication to already existing components like a smoke detector. An illustrative embodiment is shown in FIG. 30, with an integrated system 3000. In the integrated system 3000, an existing security system 3005 exists. Existing security system 3005 can include a dry switch socket 3010 and a wireless socket 3015. The wireless socket 3015 may be a 344.94 MHz wireless socket. Other embodiments may only have a wireless socket 3015 or a dry switch socket 3010. The dry switch socket 3010 may be connected to an NC (normally closed) dry switch relay 3030, which is also tied in to a wireless interface 3035. The wireless interface 3035 can then communicate with nodes, such as node 3040. In addition to the NC dry switch relay 3030 and the wireless interface 3035, a system may also have an RF (radio frequency) bridge 3020. However, if a dry switch socket 3010 is not present in the existing security system 3005, an NC dry switch relay 3030 and wireless interface 3035 would not be used. If there is a wireless socket 3015, as in the integrated system 3000, the wireless socket 3015 can communicate with the RF bridge 3020, which can communicate with nodes in the system through wireless interface 3025. In this case, wireless interface 3025 communicates with node 3045. However, if a wireless socket 3015 is not present in the existing security system 3005, an RF bridge 3020 and a wireless interface 3025 would not be used. Node 3045 can communicate with other nodes 3040 and 3050. Similarly, Nodes 3040 and 3050 can communicate with each other and with node 3045. In other embodiments, a system may have any number of nodes that are all capable of communicating with each other. All nodes may also be capable of communicating with wireless interfaces 3025 and 3035 in other embodiments. All the nodes may also be able to communicate with the internet 3055, but in this embodiment node 3050 communicates with the internet 3055. Through the internet 3055, the node 3050 can provide and receive information about the integrated system 3000 to and from a customer phone app 3060 and a first responder interface 3065.

In the integrated system 3000, the enhanced emergency detection system nodes may send alarm conditions or other communications to the existing security system, and vice versa. One embodiment could tie in to a Honeywell Newst Lynx Keypad panel which uses RF at 344.94 MHz. In this embodiment, the signal may be binary phase-shift keying. It may have a bit rate of 3663 bits per second. The negative edge may be binary 0. It also may be configured to have a most significant bit (MSB) first. The first two bytes may be a preamble. The next three bytes may be a serial number. The next byte may be a status. Alternatively, the status could be a four bit nibble instead of a byte. Examples of values of the status may be 0xA0 (open), 0x80 (closed), or 0xC0 (tampered). The last two bytes may be an error check code, such as a cyclic redundancy check.

In another embodiment of an enhanced emergency detection system, the system may have custom alarm messages. Alarm messages may be broadcast by the nodes themselves. The messages may be customized by room or zone. A zone may be a particular wing, floor, area, type of room, or section of a structure. Messages may be downloaded to nodes to make playing the message easier and make it ready for playback during an alarm condition. A user may be able to record a message themselves and customize it like any other alarm message. Simulations may be conducted to verify that customizable and other alarm messages and escape plans are working properly.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system for detecting dangerous conditions in a structure and determining one or more evacuation routes for occupants of the structure, the system comprising:
- a sensory node, the sensory node comprising:
  - a sensor;
  - a power source;
  - a transceiver;
  - a processor in electrical communication with the power source; and
  - a memory, the memory comprising instructions which cause the processor to:
    - receive a condition value from the sensor;
    - transmit, using the transceiver, a digital signal, the digital signal comprising a trailing edge;
    - transmit after the trailing edge of the digital signal, using the transceiver, an analog signal representing the condition value;
    - transmit a sensory node identifier;

a decision node, the decision node comprising:
a power source;
a transceiver;
a processor in electrical connection with the power source; and
a memory, the memory comprising instructions which cause the processor to:
receive from the sensory node, a first signal and in response to the first signal, sending a signal to the sensory node that changes a behavior of the sensory node, the first signal comprising a digital component and an analog component, the analog component located after a trailing edge of the digital signal;
identify a first hazardous condition from a trend identified using the analog signal component and previously received analog signal components from the sensory node;
using the sensory node identifier, identify the location of the sensory node from which the first signal was received;
receive occupancy data from the sensory node;
determine an occupancy level in the vicinity of the sensory node;
determine a first evacuation route from the location of the sensory node to an exit from the structure wherein the first evacuation route is determined from the layout of the structure and at least partially using the occupancy level; and
determine a second evacuation route from the location of the sensory node to an exit from the structure if the first evacuation route cannot accommodate a number of occupants identified by the occupancy level.

2. The system of claim 1, wherein the memory of the decision node further comprises software instructions which cause the processor to:
determine a magnitude of the hazardous condition using the identified trend and the analog signal component; and
further determine the first and second evacuation routes based upon the magnitude of the hazardous condition.

3. The system of claim 1, further comprising:
a second sensory node;
the memory of the decision node further comprises software instructions that cause the processor to:
receive from the second sensory node, a second signal comprising a digital component and an analog component, the analog component located after a trailing edge of the digital signal;
receive from the second sensory node, a second sensory node identifier;
identify a second hazardous condition from a trend identified using the analog component and previously received analog components from the second sensory node; and
using the second sensory node identifier, identify the location of the second sensory node;
and wherein the evacuation route is comprised of a plurality of evacuation route portions, the portions determined based on the layout of the structure and locations of the sensory node and the second sensory node, the selection of one of the plurality of evacuation route portions is determined based on the location of the second hazardous condition.

4. The system of claim 3, wherein the selection of one of the plurality of route portions is determined by the decision node based on the location of the second hazardous condition.

5. The system of claim 3, further comprising a second decision node and wherein at least one evacuation route portion is determined by the second decision node.

6. The system of claim 1, wherein the occupancy level is determined directly from occupancy data.

7. The system of claim 1, wherein the occupancy level is estimated using historic occupancy data and a time at which the hazardous condition is detected.

8. The system of claim 1, where the change in behavior of the sensory node is a change in a listening schedule.

9. A method of detecting a dangerous condition in a structure and determining one or more evacuation routes for occupants of the structure, comprising:
receiving a first signal from a first sensory;
receiving from the first sensory node, the first signal, the first signal comprising a digital component and an analog component, the analog component located after a trailing edge of the digital signal,
sending a control signal to the sensory node in response to the first signal that changes a behavior of the sensory node;
transmitting by the first sensory node, a sensory node identifier identifying a location of the condition sensor;
receiving by a first processor, the first signal, the analog component representing condition data;
identifying by the first processor, a hazardous condition using the analog component and previously received analog components from the first sensory node;
receiving by the first processor, the sensor identifier and identifying the location of the hazardous condition based on the location of the first sensory node;
receiving by the first processor, occupancy data from the first sensory node;
determining an occupancy level at the location of the first sensory node;
determining a first evacuation route from the location of the first sensory node to an exit from the structure wherein the first evacuation route is determined at least partially based on the occupancy level; and
determining a second evacuation route from the location of the first sensory node to an exit from the structure if the first evacuation route cannot accommodate the occupancy level.

10. The method of claim 9, further comprising:
determining a magnitude of the hazardous condition from the analog component; and
further determining the first and second evacuation routes based upon the magnitude of the hazardous condition.

11. The method of claim 9, comprising:
receiving a signal from a second sensory node comprising a second analog component;
identifying a second hazardous condition from the second analog component;
identifying the location of the second sensory node from which the analog signal was received; and
determining a plurality of evacuation route portions based on the layout of the structure and locations of the first sensory node and the second sensory node, the selection of one of the plurality of route portions is determined by the first processor based on the location of the second hazardous condition.

12. The method of claim 11, wherein the selection of one of the plurality of evacuation route portions is further determined based on the occupancy level.

13. The method of claim 9, wherein the occupancy level is determined directly from occupancy data.

14. The method of claim 9, wherein the occupancy level is estimated using historic occupancy data and a time at which the hazardous condition is detected.

15. The method of claim 9, wherein the sensory node receives the control signal which causes the sensory node to change a listening schedule.

16. A method of detecting dangerous conditions in a structure and determining one or more evacuation routes for occupants of the structure, comprising:

receiving a condition value from a first condition sensor located at a sensory node;

transmitting by the sensory node, a digital signal, the digital signal comprising a trailing edge;

transmitting by the sensory node, after the trailing edge of the digital signal, an analog signal representing the condition value;

transmitting by the sensory node, a sensory node identifier identifying a location of the first condition sensor;

receiving by a decision node, the analog signal;

identifying a hazardous condition from the analog signal;

sending, by the decision node, a control signal to the sensory node in response to the first signal;

receiving, by the sensory node, the control signal, the sensory node changing a listening schedule in response to the control signal;

receiving by the decision node, the sensor identifier and identifying the location of the hazardous condition;

determining an occupancy level at the location of the hazardous condition;

determining a first evacuation route portion from the location of the hazardous condition to first intermediate point in the structure;

determining a second evacuation route portion from the first intermediate point to a second intermediate point; and continuing to determine evacuation route portions until an evacuation route portion begins at an intermediate point and ends at an exit from the structure.

17. The method of claim 16, further comprising:

determining an alternate first evacuation route portion from the location of the hazardous condition to an alternate first intermediate point if the first evacuation route portion cannot accommodate the determined occupancy level;

determining an alternate second evacuation route portion from the alternate first intermediate point to an alternate second intermediate point where the first evacuation route portion is determined at least partially based on the determined occupancy level; and continuing to determine evacuation route portions determined at least partially based on the determined occupancy level until an evacuation route portion begins at an intermediate point and ends at an exit from the structure.

18. The method of claim 16, further comprising:

determining a magnitude of the hazardous condition from the condition value; and further determining the evacuation route portions based upon the magnitude of the hazardous condition.

19. The method of claim 16, comprising:

receiving from a second sensory node, a second signal comprising a second condition value;

identifying a second hazardous condition from the second condition value;

identifying the location of the second sensory node from which the second signal was received; and wherein the evacuation route is comprised of a plurality of evacuation route portions, the portions determined based on the organization of the structure and locations of the sensory nodes, the selection of one of the plurality of route portions is determined based on the location of the second hazardous condition.

20. The method of claim 16, wherein the selection of at least one of the plurality of evacuation route portions is determined by a second decision node.

* * * * *